(12) United States Patent
Dominique et al.

(10) Patent No.: US 12,277,536 B2
(45) Date of Patent: Apr. 15, 2025

(54) SYSTEM AND METHOD FOR TRUST-MINIMIZED REAL-TIME VALUE-EXCHANGE AND LIQUIDITY REPLENISHMENT

(71) Applicant: Mattr Holdings Limited, Tortola (VG)

(72) Inventors: Jason Dominique, Tortola (VG); Ilia Popovich, Tortola (VG)

(73) Assignee: Mattr Holdings Limited, Tortola (VG)

(*) Notice: Subject to any disclaimer, the term of this patent is extended or adjusted under 35 U.S.C. 154(b) by 0 days.

(21) Appl. No.: 18/907,831

(22) Filed: Oct. 7, 2024

(65) Prior Publication Data

US 2025/0029077 A1  Jan. 23, 2025

Related U.S. Application Data

(63) Continuation of application No. PCT/CA2024/050447, filed on Apr. 8, 2024.

(60) Provisional application No. 63/494,854, filed on Apr. 7, 2023.

(51) Int. Cl.
*G06Q 20/06* (2012.01)
*G06Q 40/04* (2012.01)

(52) U.S. Cl.
CPC ........ *G06Q 20/065* (2013.01); *G06Q 40/04* (2013.01); *G06Q 2220/12* (2013.01)

(58) Field of Classification Search
None
See application file for complete search history.

(56) References Cited

U.S. PATENT DOCUMENTS 10,521,861 B1    12/2019  Ju et al.
12,099,978 B2 *  9/2024   Bukov ............... G06Q 20/065
2019/0370792 A1  12/2019  Lam
(Continued)

FOREIGN PATENT DOCUMENTS

EP        3624415 A1     3/2020
WO    2020140080 A1     7/2020

OTHER PUBLICATIONS

Pandhi, Blockchain Interoperability with Cross-Chain Stablecoin Payments, Florida Institute of Technology, 2020 (Year: 2020).*
(Continued)

*Primary Examiner* — Courtney P Jones
*Assistant Examiner* — Christine Dang
(74) *Attorney, Agent, or Firm* — Cherskov Flaynik & Gurda, LLC

(57) ABSTRACT

What is disclosed is a method for trust-minimized value-exchange between a source and a destination token. An off-chain trusted API (OCTAPI) is connected to a first and a second interchain router (ICR); and a first and a second smart contract (SC). The first and second SCs are associated with source and destination chains, and comprise a first and a second vault, respectively. The first ICR is associated with the first SC and connected to a source decentralized exchange (DEX). The second ICR is associated with the second SC and connected to a destination DEX. When a transaction order is received, the OCTAPI initiates a debit swap via the first ICR and source DEX. When the OCTAPI determines the debit swap is being validated, the OCTAPI initiates a credit swap via the second ICR and destination DEX. At least some part of the debit swap and credit swap occur in parallel.

20 Claims, 11 Drawing Sheets

(56) References Cited

U.S. PATENT DOCUMENTS

2022/0101315 A1     3/2022   Patel
2022/0253866 A1     8/2022   Tedesco et al.
2022/0284419 A1     9/2022   Tedesco et al.
2022/0393881 A1*   12/2022   Ow .................... G06Q 20/3678

OTHER PUBLICATIONS

Sara Li, "International Search Report", Mailed Aug. 8, 2024, PCT/CA2024/050447, Canadian Intellectual Property Office.
Sara Li, "Written Opinion of the International Searching Authority", mailed Aug. 8, 2024, PCT/CA2024/050447, Canadian Intellectual Property Office.
Sara Li on behalf of The Canadian Intellectual Property Office, Written Opinion of the ISR for PCT application PCT/CA/2024/050447, issued on Jul. 31, 2024.

\* cited by examiner

SYSTEM AND METHOD FOR TRUST-MINIMIZED REAL-TIME VALUE-EXCHANGE AND LIQUIDITY REPLENISHMENT

The instant application claims priority to international application PCT/CA2024/050447, with an international filing date of Apr. 8, 2024, presently pending, which in turn claimed priority to U.S. provisional application 63/494,854, filed on Apr. 7, 2023. The contents of each application are hereby incorporated by reference.

FIELD OF THE INVENTION

The present disclosure relates to decentralized finance and trust-minimized systems.

SUMMARY

A system for trust-minimized real-time inter-chain value-exchange between a source token and a destination token comprising: a real-time trust-minimized value exchange rail communicatively coupled to a payment services provider via a network. The real-time trust-minimized value exchange rail comprises a unified trust-minimized exchange subsystem further comprising: an off-chain trusted application programming interface (API) communicatively coupled to: a first interchain router and a second interchain router, and a first smart contract and a second smart contract. The first smart contract is associated with a source chain and comprises a first vault. The second smart contract is associated with a destination chain and comprises a second vault. The first interchain router is associated with the first smart contract and communicatively coupled to a source decentralized exchange (DEX) associated with the source chain. The second interchain router is associated with the second smart contract and communicatively coupled to a destination DEX associated with the destination chain. The real-time trust-minimized value exchange rail receives a transaction order from the payment services provider. Based on the received transaction order, the off-chain trusted API initiates a debit swap of an amount of the source token to an amount of source stablecoin using the first interchain router and the source DEX. The debit swap further comprises the amount of the source token being directed to the source DEX from a source cryptocurrency address, the amount of the source token being converted into the amount of the source stablecoin via the source DEX, and the first smart contract facilitating the storage of the amount of source stablecoin in the first vault. The off-chain trusted API monitors an on-chain process associated with the source DEX to determine a validation status of the debit swap. The off-chain trusted API receives information related to the transaction order comprising a value corresponding to the amount of source stablecoin. When the off-chain trusted API determines the debit swap is being validated, the off-chain trusted API initiates a credit swap. The initiating comprises performing a transaction call on the second smart contract, which comprises: the off-chain trusted API transmitting the value to the second smart contract. The credit swap further comprises: the second interchain router directing an amount of destination stablecoin corresponding to the value from the second vault to the destination DEX for conversion into an amount of the destination token, the second interchain router directing the amount of the destination token to a destination cryptocurrency address communicatively coupled to the real-time trust-minimized value exchange rail, and further wherein at least some part of the debit swap and credit swap occur in parallel.

A method for trust-minimized real-time inter-chain value-exchange between a source token and a destination token, wherein a real-time trust-minimized value exchange rail is communicatively coupled to a payment services provider via a network. The real-time trust-minimized value exchange rail comprises a unified trust-minimized exchange subsystem further comprising: an off-chain trusted API communicatively coupled to: a first interchain router and a second interchain router, and a first smart contract and a second smart contract. The first smart contract is associated with a source chain and comprises a first vault. The second smart contract is associated with a destination chain and comprises a second vault. The first interchain router is associated with the first smart contract and communicatively coupled to a source DEX associated with the source chain. The second interchain router is associated with the second smart contract and communicatively coupled to a destination DEX associated with the destination chain. The method further comprises: receiving, by the real-time trust-minimized value exchange rail, a transaction order from the payment services provider. Based on the receiving, the method comprises initiating, by the off-chain trusted API, a debit swap of an amount of the source token to an amount of source stablecoin using the first interchain router and the source DEX. The debit swap further comprises directing the amount of the source token to the source DEX from a source cryptocurrency address, converting the amount of the source token into the amount of the source stablecoin via the source DEX, and facilitating, by the first smart contract, the storage of the amount of source stablecoin in the first vault. The method comprises monitoring, by the off-chain trusted API, an on-chain process associated with the source DEX to determine a validation status of the debit swap. The method comprises receiving, by the off-chain trusted API, information related to the transaction order comprising a first value corresponding to the amount of source stablecoin. When the off-chain trusted API determines the debit swap is being validated, the method comprises initiating, by the off-chain trusted API, a credit swap, wherein the initiating comprises performing a transaction call on the second smart contract, which further comprises: the off-chain trusted API transmitting the first value to the second smart contract. The credit swap further comprises: directing, by the second interchain router, an amount of destination stablecoin corresponding to the first value from the second vault to the destination DEX for conversion into an amount of the destination token, and directing, by the second interchain router, the amount of the destination token to a destination cryptocurrency address communicatively coupled to the real-time trust-minimized value exchange rail, and further wherein at least some part of the debit swap and credit swap occur in parallel.

A system to determine accordance of a token with an on-chain clearing protocol (OCCP). The system comprises an interchain payments API, which in turn comprises a clearing unit and a protocol database storing one or more criteria related to the OCCP. The clearing unit and the protocol database are communicatively coupled with each other. The clearing unit communicates with the protocol database to retrieve the one or more criteria. The clearing unit uses the one or more retrieved criteria to perform one or more assessment operations for the token. Based on the performing of the one or more assessment operations, the clearing unit determines whether the token is in accordance with the OCCP.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
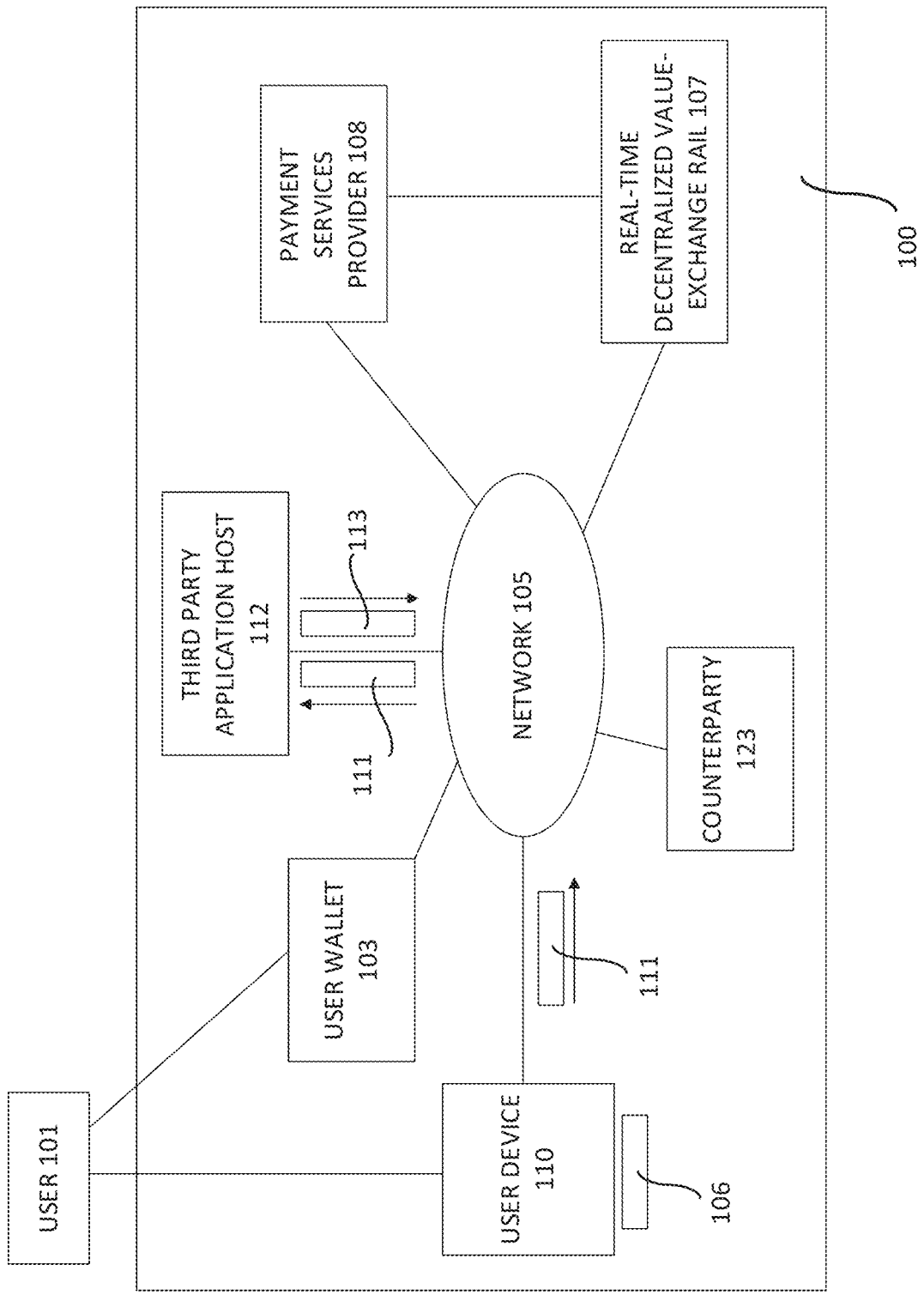
FIG. 1 is an illustrated example of an embodiment of a system for real-time trust-minimized value-exchange and replenishment.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Trust minimization refers to a general set of techniques designed to make processes more predictable by accounting for all variables and either controlling, incentivizing, or severely minimizing their impact. One of the aims of trust minimization is reducing dependence on the trustworthiness of centralized intermediaries.

One of the core tenets of trust minimization is decentralization, which refers to the distribution of control and decision-making across a network of participants. Within finance, decentralized finance ("DeFi") ecosystems enable individuals and organizations to access a wide range of financial services without the need for a centralized intermediary, such as a bank or payment provider. DeFi holds the promise of empowering everyday consumers via peer-to-peer exchange technologies, thereby enabling everyday consumers to enjoy transactions without being penalized by having to pay transaction costs to middlemen and gatekeepers. This could lead to greater financial inclusion, lower costs, and increased competition in the financial sector. Core technologies to enable DeFi include blockchain and cryptocurrencies.

Trust minimization also emphasizes the importance of transparency in the payment process. One way to ensure transparency is by recording all transactions on public blockchains. A blockchain is a decentralized, distributed ledger where financial transactions are recorded in computer code. The terms "blockchain" and "chain" will be used interchangeably for the rest of this specification. A public blockchain is a blockchain where the ledger is made public. All parties which use a DeFi application have an identical copy of this public ledger. Transactions in this public ledger are recorded in an encrypted manner. There is no middleman or gatekeeper managing the system. Transactions are verified and recorded by parties who use the same blockchain, through a process of solving complex math problems and adding new blocks of transactions to the chain. This level of transparency fosters trust among users and provides a level of accountability often lacking in traditional payment systems.

A cryptocurrency is a digital currency in which transactions are verified and records maintained via a blockchain and using cryptography, rather than by a centralized authority.

In the current DeFi landscape, decentralized exchanges (DEXes) are used to make transactions. A DEX is a peer-to-peer marketplace where parties make transactions directly without handing over management of their funds to an intermediary or custodian. A DEX relics on smart contracts to allow parties to execute orders without an intermediary. Parties can trade directly from their wallets by interacting with the smart contracts behind the DEX trading platform. As explained previously, one of the core tenets of trust minimization is decentralization. Therefore decentralized components such as DEXes serve as trust-minimized components.

Implementing DeFi in a real-time manner poses challenges. A first challenge is ensuring that parties can trust one another sufficiently to engage in transactions. For example, parties may need to ensure that the counterparties they are dealing with would pass a Know Your Client (KYC) check and are not involved in money laundering, scamming or other criminal and fraudulent activities. To that end, there is a need for an on-chain clearing protocol (OCCP) and techniques to implement such an OCCP in a decentralized manner.

A further challenge in implementing value exchange in real-time DeFi is ensuring that transactions occur seamlessly, that is, when a transaction is performed, the parties must feel as though the transaction occurred with a minimum of effort, time and complexity.

Another challenge in implementing real-time DeFi is ensuring scalability. For a DeFi system to work in real-time it must be scalable, that is, it must be able to accommodate a rapidly growing number of transactions without degradation in processing capability. Otherwise, transactions in the DeFi system would not occur seamlessly. Programmable approaches are necessary to ensure scalability and seamlessness.

To secure the best rates and minimize fees, users need to compare prices and liquidity across multiple DEXes, necessitating navigation through different DEX interfaces. Manual comparison is inefficient and does not enable scalability. DEX aggregators such as 1inch have the ability to optimize various transaction parameters to enhance the user experience without having to navigate to all the various DEX interfaces. However, many DEX aggregators:
- suffer from latency issues;
- do not have sufficient capacity to deal with a high volume of requests or calls; or
- may restrict accessibility if the amount of requests or calls exceeds a certain threshold. These issues can seriously reduce scalability of services, and limit availability of services to users.

In order to ensure seamlessness and scalability, it is necessary to ensure interoperability between cryptocurrencies, that is, ensuring that transactions can occur between cryptocurrencies. In particular, it is necessary to ensure that value can be exchanged across the different blockchains corresponding to the different cryptocurrencies.

Many prior art and prior use systems suffer from issues when it comes to exchanging value across the different blockchains.

Cross-chain technologies are technologies used to facilitate interactions between different blockchains, including the use of wrapped assets, such as in bridging, and various other operations such as on-chain relaying.

However, previously developed cross-chain mechanisms require extensive customization to each chain, which led to reduced speed and throughput. An example of such a customized cross chain mechanism is a cross chain bridge. Using cross-chain bridges to facilitate interactions often demands that users:
- hold native tokens on both origin and destination chains for gas fees, complicating transactions,
- face disproportionately high fees, especially for smaller transfers,
- become accustomed to various blockchain protocols,
- handle complex operations, and
- switch to different interfaces for asset transfer.

Furthermore, customized cross-chain approaches work only in siloed blockchain environments such as Ethereum Virtual Machine (EVM) and Solana (SOL). As would be appreciated by a person of skill in the art this may lead to adoption difficulties. Cross-chain approaches such as bridges have been shown to lead to security vulnerabilities.

For example, U.S. Pat. No. 10,521,861 and European Patent Application 3,624,415 disclose the use of a DEX with a decentralized asset custody and clearing platform, but not an OCCP as discussed above.

Also, currently DEXes tend to be tied to one chain. This makes transferring assets from one chain to another difficult. Mechanisms to transfer assets, such as locking mechanisms and minting new tokens tend to be slow, insecure, risky and complex, thus limiting scalability and seamlessness.

An example of a prior use approach used to transfer assets across chains is that employed by LayerZero. The LayerZero approach relies on a communication primitive involving Oracles and Relayers. An formula representing the LayerZero approach is presented below:

$$L_0 = m(t(T_1A, H_1A, P_1A, O_1A, R_1A, T_1B), t(T_2A, H_2A, P_2A, O_2A, R_2A, T_2B))$$

The Oracle provides the block header ($H_1A$, $H_2A$), while the Relayer provides the proof associated with a transaction ($P_1A$, $P_2A$). Additionally, $O_1A$ and $O_2A$ represent the Oracle's signatures, and $R_1A$ and $R_2A$ represent the Relayer's signatures.

This approach is complex, and also slow due to its serial nature, that is, there is a need to wait for proof and valid delivery before the next step can proceed. This reduces efficiency, seamlessness and potential scalability.

Therefore, there is a need for a system which enables flexible and efficient value-exchange across chains, and unification of DEXes on different chains, to improve interoperability and therefore seamlessness and scalability.

Finally, it is necessary for seamlessness and scalability to automate key aspects of the payment process such as transaction routing, clearing, watching, relaying and settlement. Smart contracts enable automation of these mechanisms. By replacing manual intervention with automated smart contracts, the potential for human error, fraud, and manipulation is significantly reduced. Smart contracts enable automation of liquidity management. The provision of liquidity management comprises, for example replenishment of liquidity and rebalancing of vaults as necessary. In a traditional finance setting, liquidity management is carried out by a central bank. There is a need for similar mechanisms in a DeFi ecosystem.

PCT Application WO/2020/1440080 discloses a trade engine module that implements a pricing model that queries prices of goods generated from multiple exchanges, and also takes into account current liquidity of exchanges on both sides of an order book. However such a system does not provide the scalability and seamlessness necessary for a decentralized financial ecosystem. Specifically, it does not explain how liquidity is replenished or vaults are rebalanced as needed.

Therefore, none of the prior art and prior use systems are sufficient to enable the creation of a scalable, seamless and trustworthy real-time DeFi ecosystem.

Interchain technologies refer to applications which are indifferent to specific blockchain networks. These applications integrate functionalities from various blockchains and are accessible to users across any chain. Unlike the previously developed customized cross-chain approaches, interchain technologies are developed from the ground up to be indifferent to specific chains. These technologies focus on amalgamating logic and network effects, and connecting assets across various chains. Interchain technologies facilitate interaction between different blockchains without the difficulties imposed by the previously developed customized cross-chain technologies.

A system and method which utilizes interchain approaches to overcome the above-described problems is described below.

FIG. 1 shows an example embodiment of such a system 100. In FIG. 1, user device 110 is communicatively coupled to, for example, third party application host 112 via network 105. Third party application host 112 is communicatively coupled to payment services provider (PSP) 108 via network 105. User 101 wishes to perform transaction 106 utilizing user device 110. Then, user 101 utilizes user device 110 to send one or more requests 111 associated with transaction 106 to third party application host 112 via network 105.

User 101 is, for example, an individual or an organization such as a business, enterprise or company.

Figure 2:
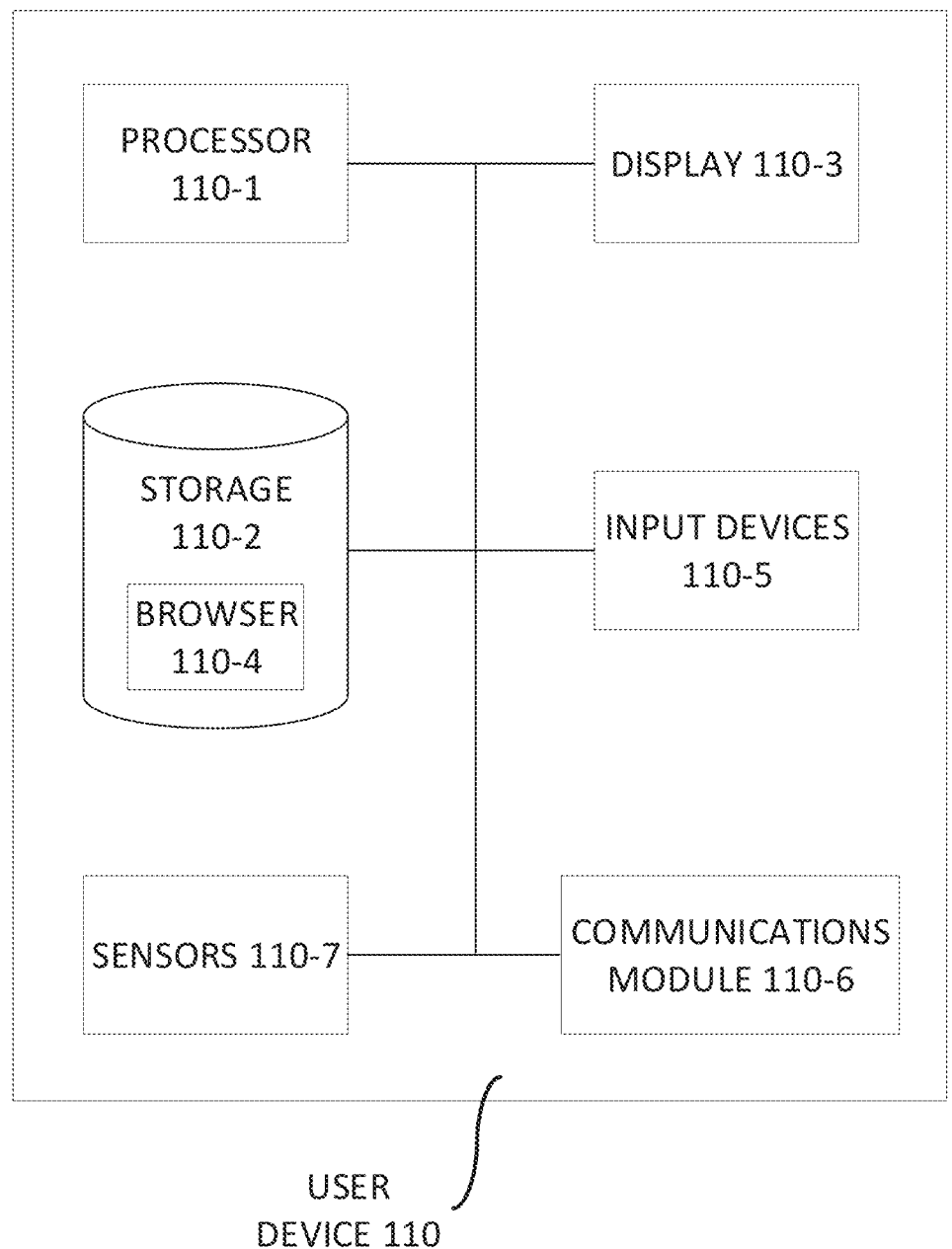
FIG. 2 is an illustrated example of an embodiment of a user device.

User device 110 is, for example, an appropriate computing and network-enabled device such as a laptop, desktop, server, smartphone or tablet. An example embodiment of user device 110 is shown in FIG. 2. In FIG. 2, processor 110-1 performs processing functions and operations necessary for the operation of user device 110, using data and programs stored in storage 110-2. An example of such a program is browser 110-4. Display 110-3 performs the function of displaying data and information for user 101. Input devices 110-5 allow one of the development users 101 to enter information. This includes, for example, devices such as a touch screen, mouse, keypad, keyboard, microphone, camera, video camera and so on. In some embodiments, display 110-3 is a touchscreen which means it is also part of input devices 110-5. Communications module 110-6 allows user device 110 to communicate with devices and networks external to user device 110. This includes, for example, communications via BLUETOOTH®, Wi-Fi, Near Field Communications (NFC), Radio Frequency Identification (RFID), 3G, Long Term Evolution (LTE), Universal Serial Bus (USB) and other protocols known to those of skill in the art. Sensors 110-7 perform functions to sense or detect environmental or locational parameters. Sensors 110-7 include, for example, accelerometers, gyroscopes, magnetometers, barometers, Global Positioning System (GPS), proximity sensors and ambient light sensors. The components of user device 110 are coupled to each other as shown in FIG. 2.

Browser 110-4 allows a user 101 to interact with PSP 108 via network 105. For example, a website is presented to the user 101 via browser 110-4. The user 101 then interacts with the presented website using, for example, input devices 110-5, to perform transactions such as transaction 106.

One of skill in the art would know that a browser is not the only way for the user 101 to perform a transaction. In some embodiments, user 101 performs a transaction 106 via an application such as a desktop application or a mobile application.

User wallet 103 is associated with user 101. As would be known to one of skill in the art, there are a variety of ways to implement user wallet 103. For example, in some embodiments the user wallet 103 is implemented using an online wallet provider. Examples of such providers are COINBASE™ wallet, EXODUS™ wallet and METAMASK™. Then, the user can access such an online wallet provider using, for example, browser 110-4 or an application running on user device 110. In other embodiments, user wallet 103 is implemented using a hardware wallet such as LEDGER™. In some embodiments, anti-money laundering (AML) and know your client (KYC) checks are performed on user wallet 103 using, for example, one or more third party services. One of skill in the art would know that user wallet 103 is one example of a cryptocurrency address and that the system and method described below could be used with other cryptocurrency addresses, for example, a custodial account or any type of smart contract which could be used to store tokens or digital assets. One of skill in the art would also know from the above that in some embodiments, the cryptocurrency address which serves as the source, can also be the destination. That is, the source cryptocurrency address and the destination cryptocurrency address are the same. In other embodiments, such as when a counterparty 123 is involved, the source cryptocurrency address and the destination cryptocurrency address are different.

Network 105 plays the role of communicatively coupling each component of the system to other components of the system as needed. Network 105 can be implemented using a variety of networking and communications technologies. In some embodiments, network 105 is implemented using wired technologies such as Firewire, Universal Serial Bus (USB), Ethernet and optical networks. In some embodiments, networks 105 are implemented using wireless technologies such as WiFi, BLUETOOTH®, NFC, 3G, LTE and 5G. In some embodiments, networks 105 are implemented using satellite communications links. In some embodiments, the communication technologies stated above include, for example, technologies related to a local area network (LAN), a campus area network (CAN) or a metropolitan area network (MAN). In yet other embodiments, network 105 are implemented using terrestrial communications links. In some embodiments, network 105 comprises at least one public network. In some embodiments, network 105 comprises at least one private network. In some embodiments, network 105 comprises one or more subnetworks. In some of these embodiments, some of the subnetworks are private. In some of these embodiments, some of the subnetworks are public. In some embodiments, communications within network 105 are encrypted.

In some embodiments, user 101 performs transaction 106 by interacting with third party application host 112 via a website using a browser such as browser 110-4, or using a desktop or mobile application.

Examples of transaction 106 are:

user 101 purchasing an asset such as a token from a first chain using an asset such as a token from a second chain, or with a fiat currency;

user 101 using one cryptocurrency from user wallet 103 to purchase another cryptocurrency and deposit into user wallet 103.

user 101 purchasing an asset where the seller accepts payment only in a certain digital asset which only exists on a certain chain;

user 101 wanting to performing staking in a cryptocurrency that supports proof of stake, using fiat or another cryptocurrency; and user 101 wanting to vote on a Decentralized Autonomous Organization (DAO) protocol which accepts payment only in a certain digital asset, and the user wishes to use fiat or a different cryptocurrency.

In some embodiments, the transaction 106 is carried out between user 101 on one end, and counterparty 123 on the other end. Counterparty 123 is, for example, an individual or an organization such as a business, enterprise or company. In other embodiments, the user 101 is on both ends of the transaction. An example is where the user 101 is exchanging fiat or a first cryptocurrency for a second cryptocurrency which is directed into the user wallet 103 at completion of the transaction 106.

Third party application host 112 is a host which manages, for example, a third-party application such as a decentralized Web3 or cryptocurrency-enabled application or a service to enable user 101 to perform transactions. Third party application host 112 generates, for example, an interface for user 101 to enter one or more inputs related to transaction 106.

Figure 3:
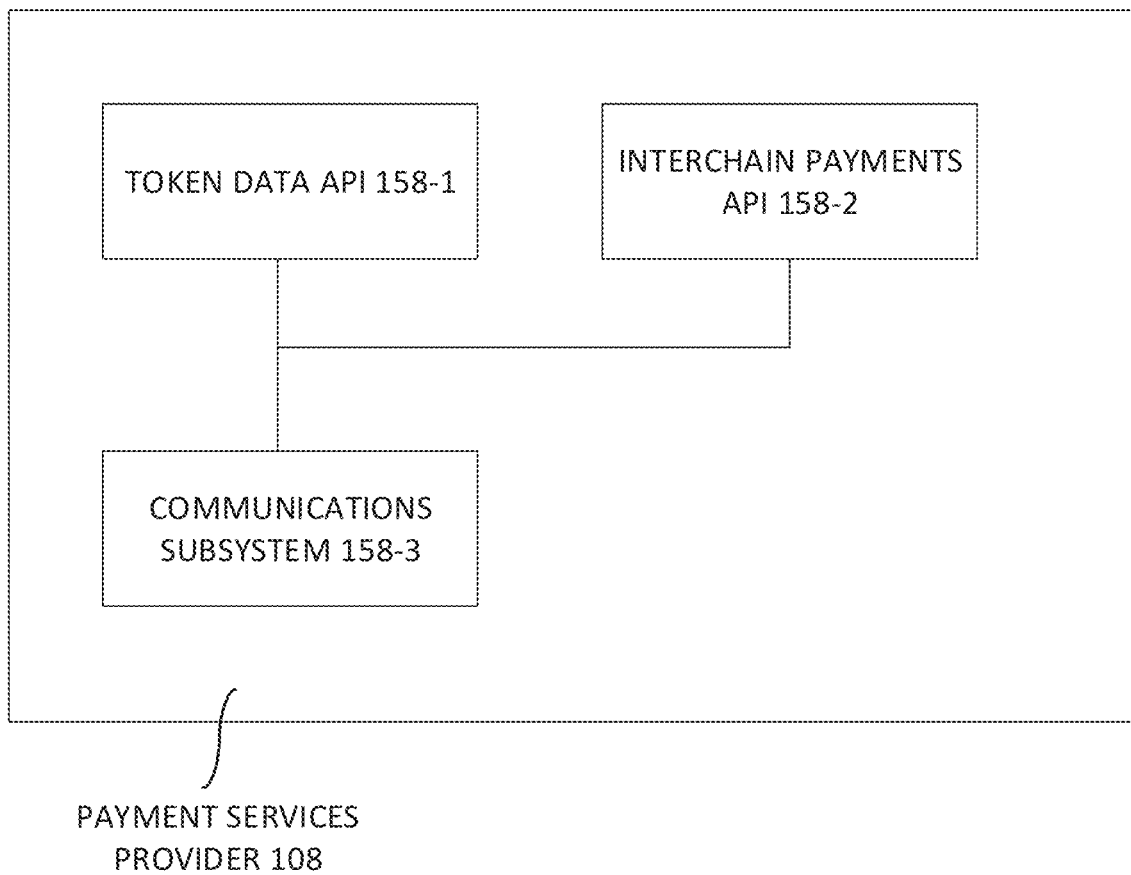
FIG. 3 is an illustrated example of an embodiment of a payment services provider.

PSP 108 is shown in more detail in FIG. 3. PSP 108 is communicatively coupled to third-party application 112. This is achieved, for example, either via a direct connection or via network 105. PSP 108 comprises a token data application programming interface (API) 158-1, an interchain payments API 158-2, and a communications subsystem 158-3. In some embodiments, PSP 108 is implemented in software. In other embodiments, PSP 108 is implemented in hardware. In yet other embodiments, PSP 108 is implemented using a combination of software and hardware. In some embodiments, PSP 108 is implemented using one or more servers.

Communications subsystem 158-3 plays the role of receiving information from, and transmitting information to components external to PSP 108. Communications subsystem 158-3 communicates using one or more communications and networking protocols and techniques known to those of skill in the art.

Token data API 158-1 stores, for example, real-time on-chain data and all necessary information to facilitate the transaction around the token. More information is provided below.

Figure 4:
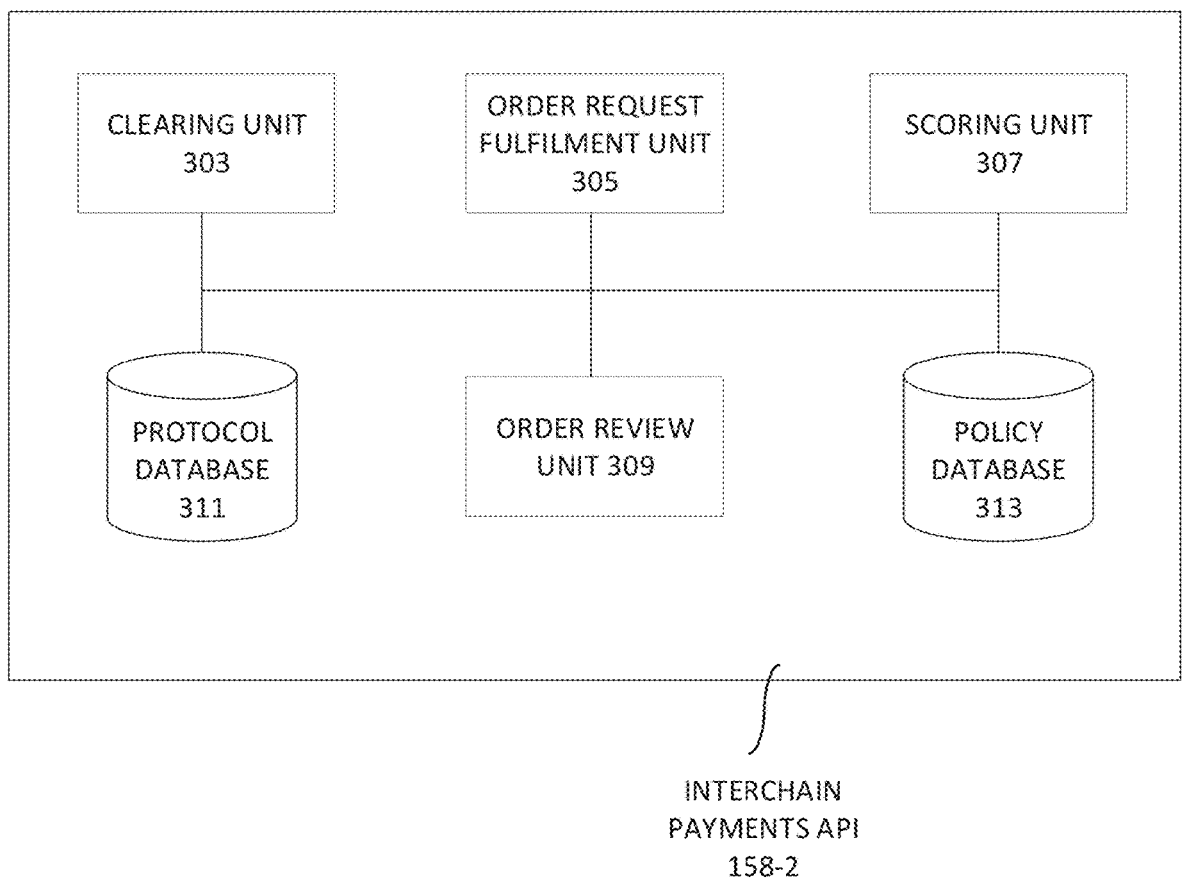
FIG. 4 is an illustrated example of an embodiment of an interchain payments application.

Interchain payments API 158-2 is shown in detail in FIG. 4. Interchain payments API 158-2 comprises clearing unit 303, order request fulfillment unit 305, scoring unit 307, order review unit 309, protocol database 311 and policy database 313. These units are communicatively coupled to each other using techniques known to those of skill in the art. The operation of these components of interchain payments API 158-2 will be explained in more detail below.

Interchain payments API 158-2 comprises protocol database 311. Protocol database 311 is used to, for example, store one or more criteria and rules related to assessment of transaction requests. In some embodiments, protocol database 311 further comprises a database server. The database server receives one or more commands from, for example, token data API 158-1, and translates these commands into appropriate database language commands to retrieve and store data into protocol database 311. In some embodiments, protocol database 311 is implemented using one or more database technologies known to those of skill in the art, such as DynamoDB. In further embodiments, when data is entered into protocol database 311, associated metadata is added so as to make it more easily searchable. In a further embodiment, the associated metadata comprises one or more tags. In yet another embodiment, protocol database 311 presents an interface to enable the entering of search queries. Further details of this are explained below. In some embodiments protocol database 311 comprises a transactional database. In other embodiments, protocol database 311 comprises a multitenant database. In yet other embodiments, protocol database 311 may be hosted by a provider such as AMAZON Web Services (AWS).

The operation of PSP 108 with regard to a transaction flow is described in further detail below.

Figure 5:
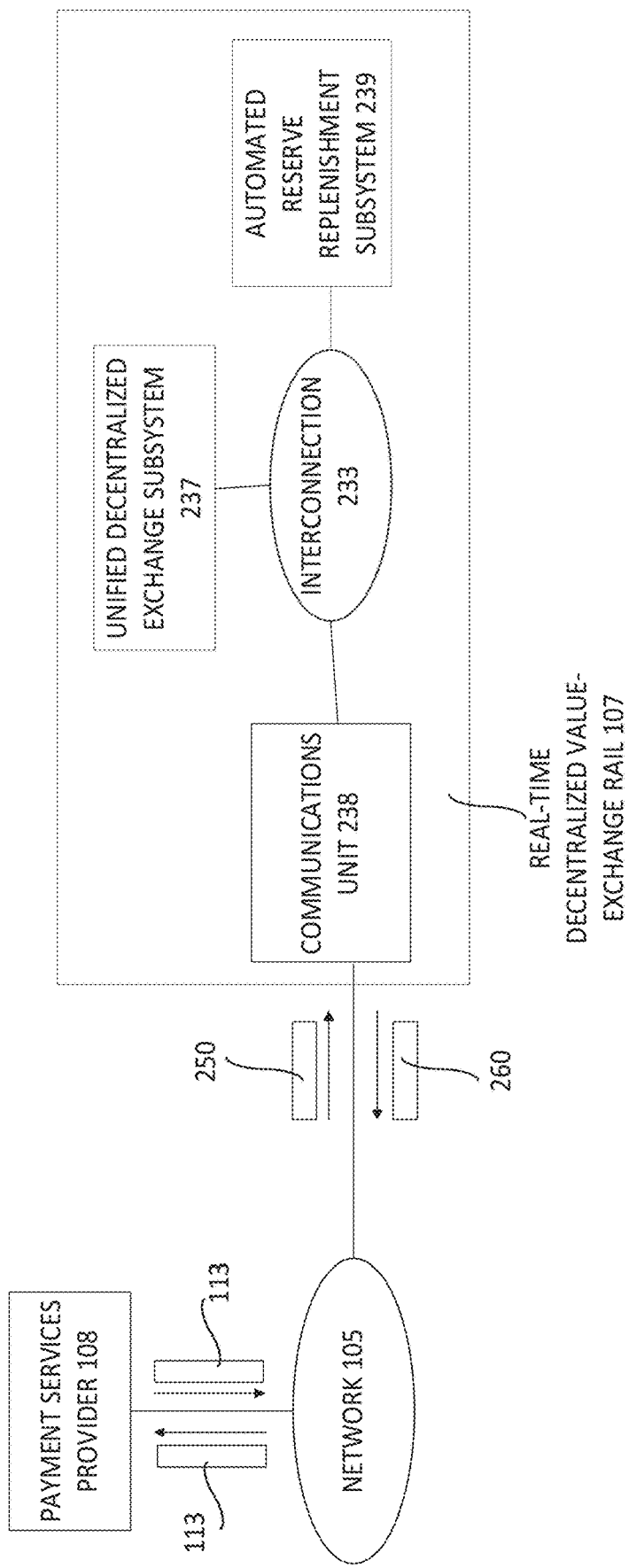
FIG. 5 is an illustrated example of an embodiment of a real-time decentralized value-exchange rail or real-time trust-minimized value-exchange rail.

Real-time decentralized value-exchange rail, or alternatively, since decentralized components serve as trust-minimized components, real-time trust-minimized value exchange rail 107, is shown in detail in FIG. 5. Real-time decentralized value exchange rail 107 comprises:

communications unit 238;
unified DEX subsystem (UDEXS) or alternatively, since decentralized components serve as trust-minimized components, unified trust-minimized exchange subsystem 237; and
automated reserve replenishment subsystem (ARRS) 239.

These components are communicatively coupled to each other via interconnection 233.

In some embodiments, UDEXS 237 is implemented in software. In other embodiments, UDEXS 237 is implemented in hardware. In yet other embodiments, UDEXS 237 is implemented using a combination of software and hardware. In some embodiments, UDEXS 237 is implemented using one or more servers.

In some embodiments, ARRS 239 is implemented in software. In other embodiments, ARRS 239 is implemented in hardware. In yet other embodiments, ARRS 239 is implemented using a combination of software and hardware. In some embodiments, ARRS 239 is implemented using one or more servers.

Interconnection 233 connects the various components of real-time trust-minimized value exchange rail 107 to each other. In some embodiments, interconnection 233 is implemented using, for example, network technologies known to those skilled in the art. These include, for example, wireless networks, wired networks, Ethernet networks, local area networks, metropolitan area networks and optical networks. In some embodiments, interconnection 233 comprises one or more subnetworks. In another embodiment, interconnection 233 comprises other technologies to connect multiple components to each other including, for example, buses, coaxial cables, Universal Serial Bus (USB) connections and so on.

Communications unit 238 plays the role of receiving information from, and transmitting information to components external to real-time trust-minimized value exchange rail 107. Communications unit 238 is similar to communications subsystem 158-3, and communicates using one or more communications and networking protocols and techniques known to those of skill in the art. Communications unit 238 receives information within, for example, incoming signals 250; and transmits information within, for example, outgoing signals 260. Communications unit 238 also extracts information from the incoming signals and sends information on to other components of real-time trust-minimized value exchange rail 107.

The components and operation of UDEXS 237 and ARRS 239 are explained in further detail below.

An example of the operation of each of the components to process a transaction flow will now be explained in detail, with reference to FIGS. 3-7C. The example presented below is for a transaction flow where user 101 wants to exchange an amount of a first token having user wallet 103 as the source, for an amount of a second token destined for either user wallet 103 or counterparty 123.

Figure 7A:
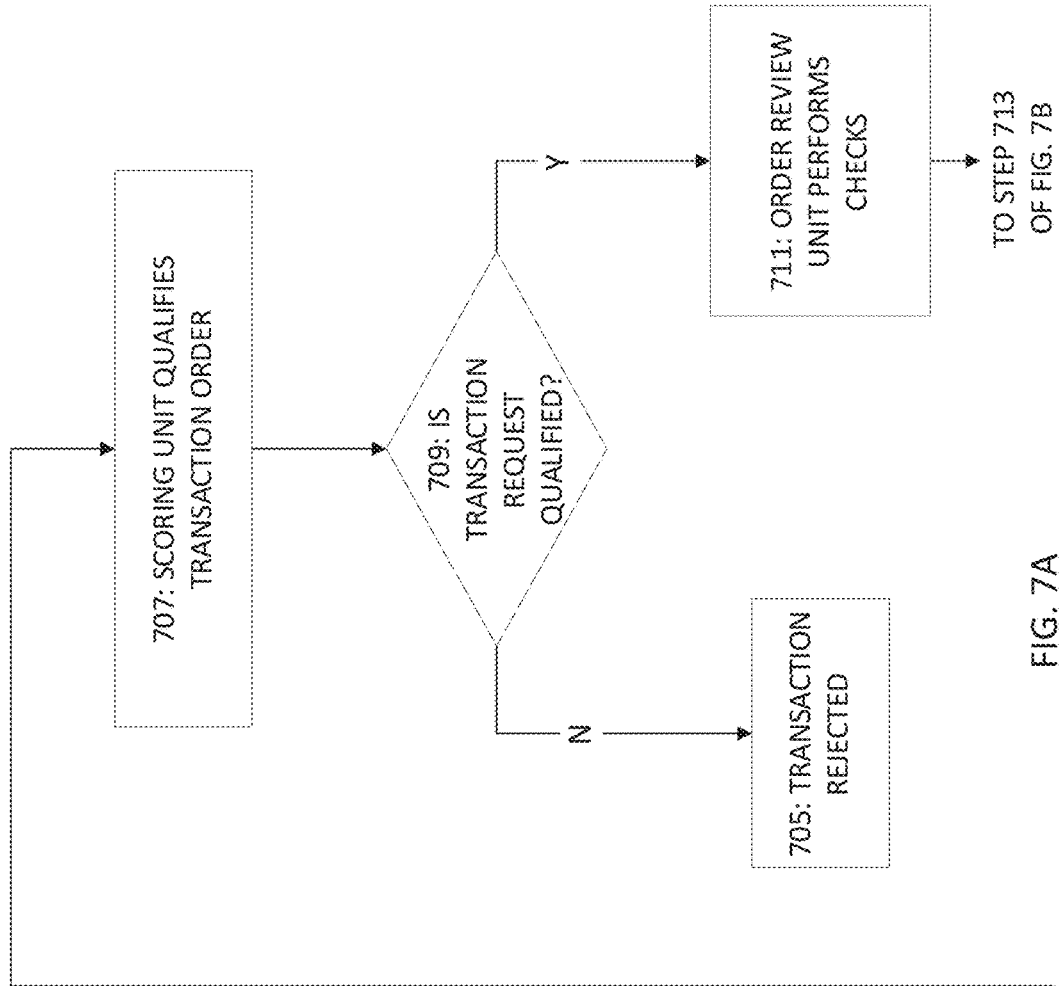
FIG. 7A is an illustrated example of an embodiment of part of an operation to process a transaction flow.
Figure 7A:
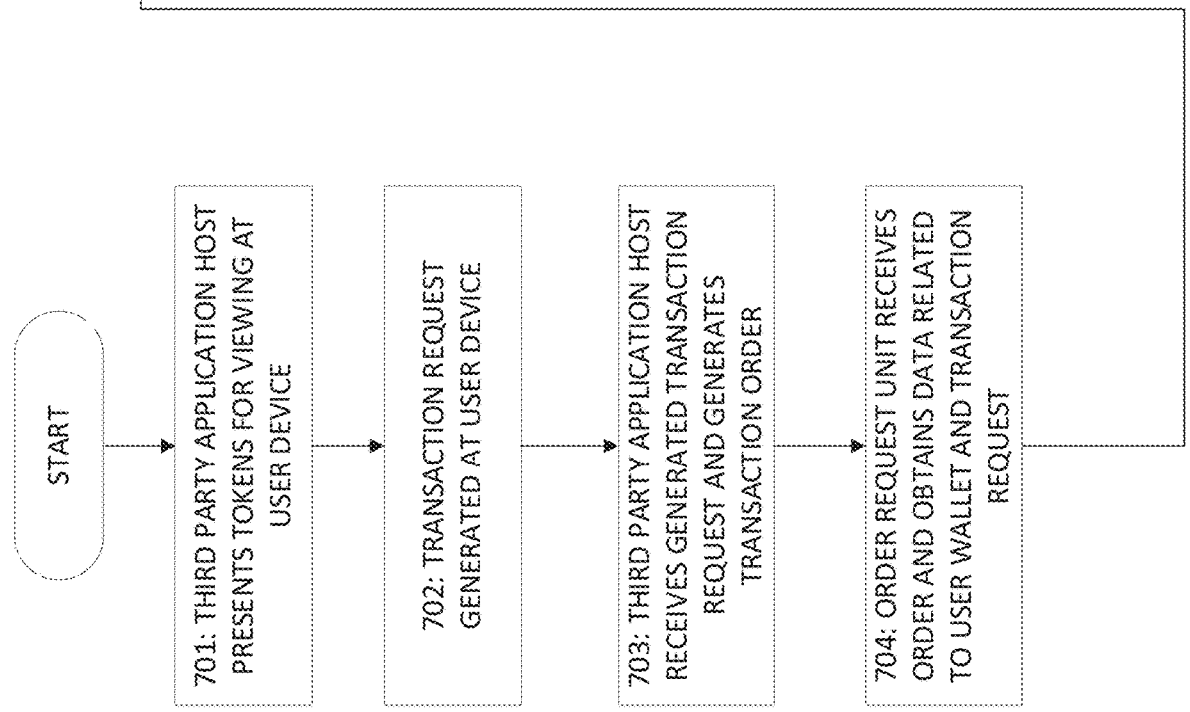

In step 701 of FIG. 7A, and with reference to FIG. 3, third party application host 112 presents one or more items for viewing by the user on display 110-3 of user device 110. In this example, the one or more items are one or more tokens. The one or more tokens which are presented on the display 110-3 are tokens which have been assessed as being in accordance with an OCCP. One or more criteria to determine admissibility of a token or other liquid asset related to the OCCP are stored in protocol database 311.

The assessment process to determine which tokens are in accordance with the OCCP proceeds independently of the transaction flow process. In some embodiments, this assessment process occurs as follows: The clearing unit 303 of the interchain payments API 158-2 communicates with protocol database 311 to retrieve the one or more OCCP-related criteria stored within protocol database 311.

The clearing unit uses these one or more retrieved criteria to perform one or more assessment operations comprising, for example:

Anti-money laundering (AML) checks,
Know Your Client (KYC) checks,
Combating the Financing of Terrorism (CFT) checks,
Fraud checks,
Code flaws identification and checks,
Liquidity pool status checks, for example, is a liquidity pool locked or unlocked, and
Liquidity pool amount checks.

In some embodiments, the one or more assessment operations comprise performing behavior prediction or forecasting operations. In some embodiments, these are performed by a recommendation engine. The recommendation engine communicates with clearing unit 303, to enable clearing unit 303 to react and take action. In some embodiments, an alert or recommendation is produced based on the behavior prediction or forecasting operations.

In some embodiments, the assessment operations are performed using computation algorithms based on one or more techniques known to those skilled in the art. In some embodiments, the computation algorithms are based on, for example, artificial intelligence (AI) or machine learning (ML). In some of the embodiments where AI or ML techniques are utilized, clearing unit 303 performs one or more operations which are related to these AI and ML techniques such as:

pre-processing of appropriate data sets prior to performing AI or ML operations such as training and testing,
    model training using appropriate training data sets,
    model testing using appropriate testing data sets,
    selecting appropriate models to use,
    performance evaluation of different AI or ML models, and
    post-processing of results.

In some embodiments, one or more of the AI or ML techniques are used within the earlier mentioned recommendation engine to perform the earlier mentioned prediction or forecasting operations.

In some embodiments, the assessment operations comprise one or more review operations. These review operations comprise determining whether or not one or more tokens which have been assessed as being in accordance with an OCCP are still in accordance with the OCCP. In some embodiments, the review operations are carried out periodically.

In some embodiments, one or more of these assessment operations are performed using one or more external services via, for example, third party APIs.

The clearing unit 303 then stores all necessary information needed to facilitate transactions around each token assessed as in accordance with the OCCP. Examples of necessary information include data related to the token so as to provide more information about the token. The necessary information comprises, for example:

real-time on-chain data;
    cached on-chain data; and,
    data stored in databases.

In some embodiments, the assessment process is run according to a schedule. Then, the list of tokens which are accordant with the OCCP, and data related to these tokens, are continuously refreshed using the rules in the protocol database 311.

The clearing unit 303 then makes the up-to-date list of accordant tokens available to the token data API 158-1. The token data API 158-1 retrieves or reads this up-to-date list of accordant tokens, and sends the up-to-date list of accordant tokens to third party application host 112. This list is presented on the interface on the display 110-3 of user device 110.

In step 702, user 101 peruses this list and selects a second or destination token to exchange for the first or source token. One or more interfaces comprising projected terms for the transaction are presented on user device 110 to user 101. When the projected terms are agreeable to the user 101, then the user interacts with the one or more interfaces presented to generate a transaction request 111 for the destination token. An example of the one or more interfaces is a checkout interface. Then, when the user 101 interacts with the checkout interface presented on user device 110, the user device 110 generates transaction request 111 for the destination token based on this interaction. The generated transaction request 111 is transmitted to the third-party application host 112 via network 105.

In step 703 of FIG. 7A, the generated transaction request 111 is received by third party application host 112, which then sends a transaction order 113 based on transaction request 111 to PSP 108 via network 105. Then PSP 108 communications unit 158-3 receives the transaction order 113 from third party application host 112. In some embodiments, this is facilitated via an API provided by the PSP 108 to third party application host 112.

In step 704 of FIG. 7A, the order request fulfillment unit 305 in interchain payments API 158-2 receives transaction order 113, then obtains the user wallet 103 data and transaction 106 details and determines the most efficient route to complete the transaction.

In step 707, scoring unit 307 in interchain payments API 158-2 qualifies the transaction order 113 using one or more criteria stored in policy database 313. The one or more criteria are based on, for example, legislation such as the Canadian Retail Payment Activities Act,
    regulations, and
    standards, for example, Deshmukh, S., Warren, S. and Werbach, K., 2021 June. Decentralized Finance: (DeFi) Policy-Maker Toolkit. In World Economic Forum (Vol. 8, No. 6, p. 2021).

The formulation and oversight of the one or more criteria, and the insertion of criteria into policy database 313 can be performed by different parties. In some embodiments, the formulation and oversight of the one or more criteria is performed by a governance committee. In some embodiments, the one or more criteria is inserted into policy database 313 by the governance committee.

Scoring unit 307 uses one or more algorithms known to those of skill in the art to qualify the transaction order 113. In some embodiments, at least one of the one or more criteria are based on a score assigned by scoring unit 307. For example, the scoring unit 307 calculates a score between 500-1,000. Then:

Scores between 500 and 699 are considered "good",
    Scores between 700 and 899 are considered "very good", and
    Scores between 900 and 1000 are considered "excellent".

In some embodiments, the third-party application host 112 sets thresholds to determine whether the transaction order 113 should proceed or not. For example, the third-party application host decides that only those transaction orders assigned an "excellent" score should proceed.

In some embodiments, the third-party application host 112 sets the criteria by selecting settings from a panel displayed from the PSP 108. For example, the third-party application host sets a Know Your Client (KYC) criteria by requiring that a payee has passed a KYC check. In some embodiments, the panel comprises basic and advanced settings. The advanced settings are customizable by the third-party application host 112.

In some embodiments, the criteria comprise algorithms based on, for example, AI and ML techniques. In some of the embodiments where AI and ML techniques are utilized, scoring unit 307 performs one or more operations which are related to these AI and ML techniques similar to those mentioned previously, such as:

pre-processing of data sets prior to performing AI or ML operations such as training and testing,
    model training using training data sets,
    model testing using testing data sets,
    selecting appropriate models to use,
    performance evaluation of different AI or ML models, and
    post-processing of data sets.

When a transaction order is not qualified (step 709), then the transaction is rejected (step 705). When a transaction order is qualified, then in step 711 the order review unit performs one or more checks necessary to complete the transaction. These comprise checking the available balance on the user wallet 103 and seeing whether there is sufficient liquidity in a vault in a smart contract, which will be explained below.

Figure 7B:
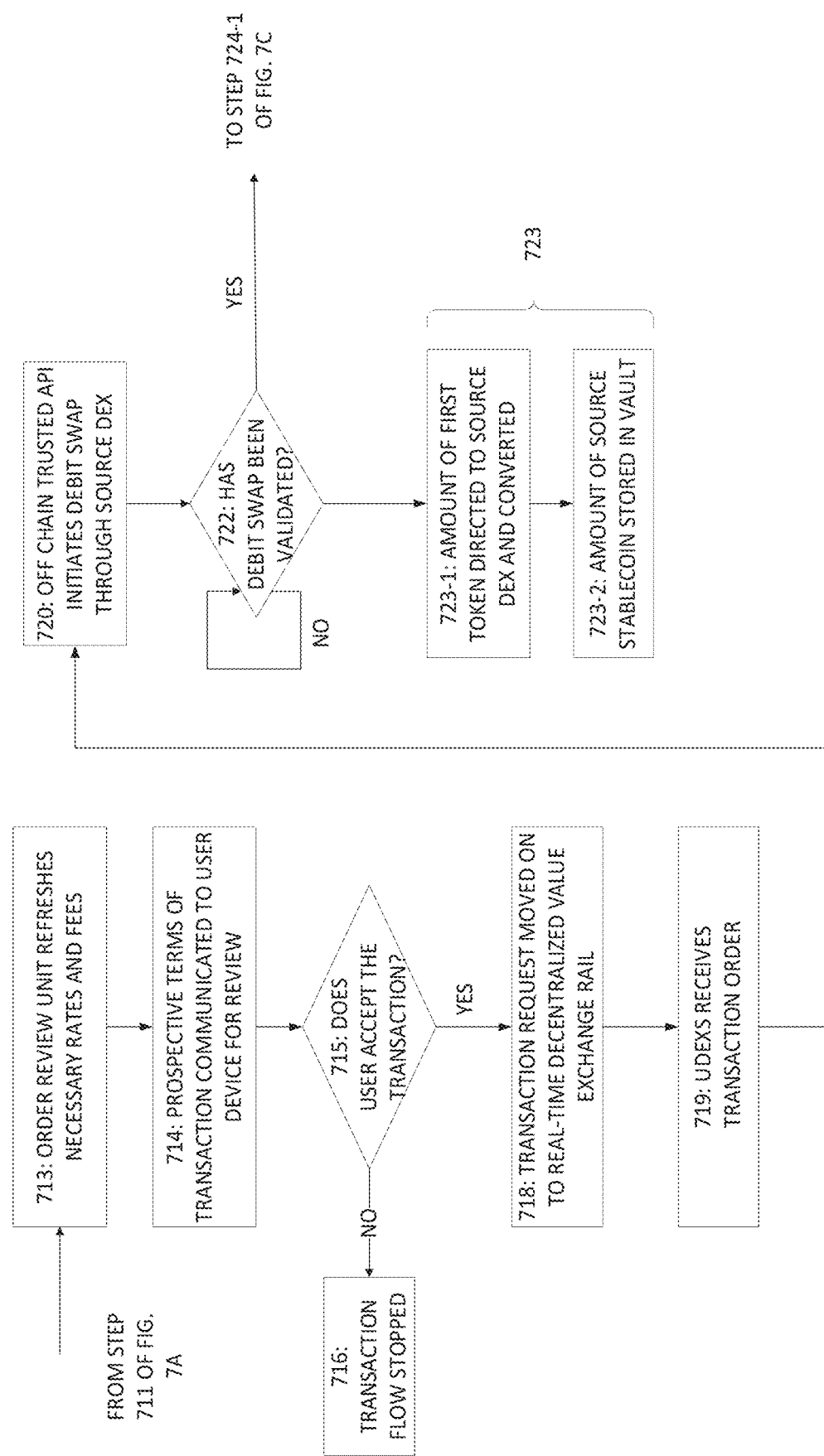
FIG. 7B is an illustrated example of an embodiment of part of an operation to process a transaction flow.

The process continues in step 713 of FIG. 7B. In step 713, the order review unit 309 then refreshes all necessary rates and fees. The fees include items such as gas fees, DEX fees and so on. In some embodiments, the calculated amount of the source token is then denoted as valid for a pre-determined period of time, for example, five (5) seconds.

Interchain approaches can also result in reduction of gas fees and time and improved security.

In step 714, prospective terms of the transaction comprising the calculated amount of the source token are communicated to the user device 110 from the PSP 108 via communications unit 158-3 and the third-party application host 112 for review by user 101. The user receives an indication on display 110-3 of user device 110 that the calculated amount of the source token is to be converted into a displayed amount of a destination token which is destined for the user 101 or for counterparty 123. In some embodiments, the user receives an indication of the probability that the calculated amount of the source token is to be converted into the displayed amount of the destination token.

By using a fixed-spending approach such as this, rather than a fixed-buying approach, this enables transactions to be executed more quickly. A fixed-spending approach also improves security against the following type of attack: In the case of a fixed-buying approach, a malicious user can proceed with a buy order for a small market capitalization token and at the same time, using one or more sniping bots and another wallet, artificially inflate the price of the small market capitalization token. Since there is commitment to meet the destination amount in the buy order, the malicious user would therefore be able to gain interest based on the price difference. This could be made in bulk, thus draining liquidity. This type of attack is not possible with a fixed-spending approach, since the user agrees to spend a pre-determined amount of the source token and the amount of the destination token that the pre-determined amount is converted into is dependent on the price. Therefore, any attempts to artificially inflate the price will adversely affect the user.

In some embodiments, this quoting functionality is performed by the interchain router 404-2. Then step 714 comprises the interchain router 404-2 selecting a route for the amount of source token from the user wallet 103 to be converted into an amount of source stablecoin. This comprises selecting an appropriate DEX to become source DEX 402 on the source chain. In some embodiments, the selection is optimized based on one or more criteria, for example, transaction costs. In some of these embodiments, the path with the least transaction cost is selected for the routing. In some embodiments, this selection is based on the results of operation of a discovery and routing algorithm. In other embodiments, the discovery and routing algorithm is implemented by interchain router 404-2. As is explained below, in some embodiments, one or more functionalities of the interchain router are implemented by the smart contract; and in some embodiments, the interchain router is entirely implemented by the smart contract. Then, the selection described above is performed by the smart contract. The results are communicated to interchain router 404-2, or the smart contract which implements the functionalities of interchain router 404-2. Once either the interchain router 404-2 or the smart contract has determined the optimal route, then either the interchain router 404-2 or the smart contract creates a quote. This quote is provided to PSP 108 via, for example, an API. The quote is then communicated to the user device 110 as explained above.

By using either the interchain router 404-2 or the smart contract to implement the discovery and routing algorithm provides an advantage over prior art systems, because: As explained previously, many commercially available DEX aggregators have latency issues; are not able to deal with a high volume of requests or calls; or may even restrict accessibility when the volume of requests or calls exceeds a certain threshold set by the DEX aggregator. These drawbacks may restrict scalability or availability of the service. In some embodiments, the operation of the discovery and routing algorithm is performed outside of system 100.

The prospective terms of the transaction are reviewed by the user 101 via user device 110, and the user receives a prompt to either confirm or cancel the transaction 106 via, for example, a pop-up interface on the display 110-3 of the user device 110.

When the user cancels the transaction 106 (step 715), then in step 716 one or more signals comprising information such as commands, instructions and data are sent by user device 110 to the third-party application host 112 over network 105. Based on this received information, third party application host 112 sends further information such as commands, instructions and data to PSP 108. PSP 108 receives this information sent by third party application host 112 and the transaction flow is stopped in step 716.

When the user confirms the transaction 106, then in step 718 one or more signals comprising information such as commands, instructions and data are sent to the third party application host 112. Based on this received information, third party application host 112 sends further information such as commands, instructions and data to PSP 108. PSP 108 receives this information sent by third party application host 112 and locks in the transaction 106. The interchain payments API 158-2 moves the transaction order 113 on to the real-time trust-minimized value exchange rail 107, specifically to the UDEXS 237, via incoming signals 250 and communications unit 238.

Figure 6A:
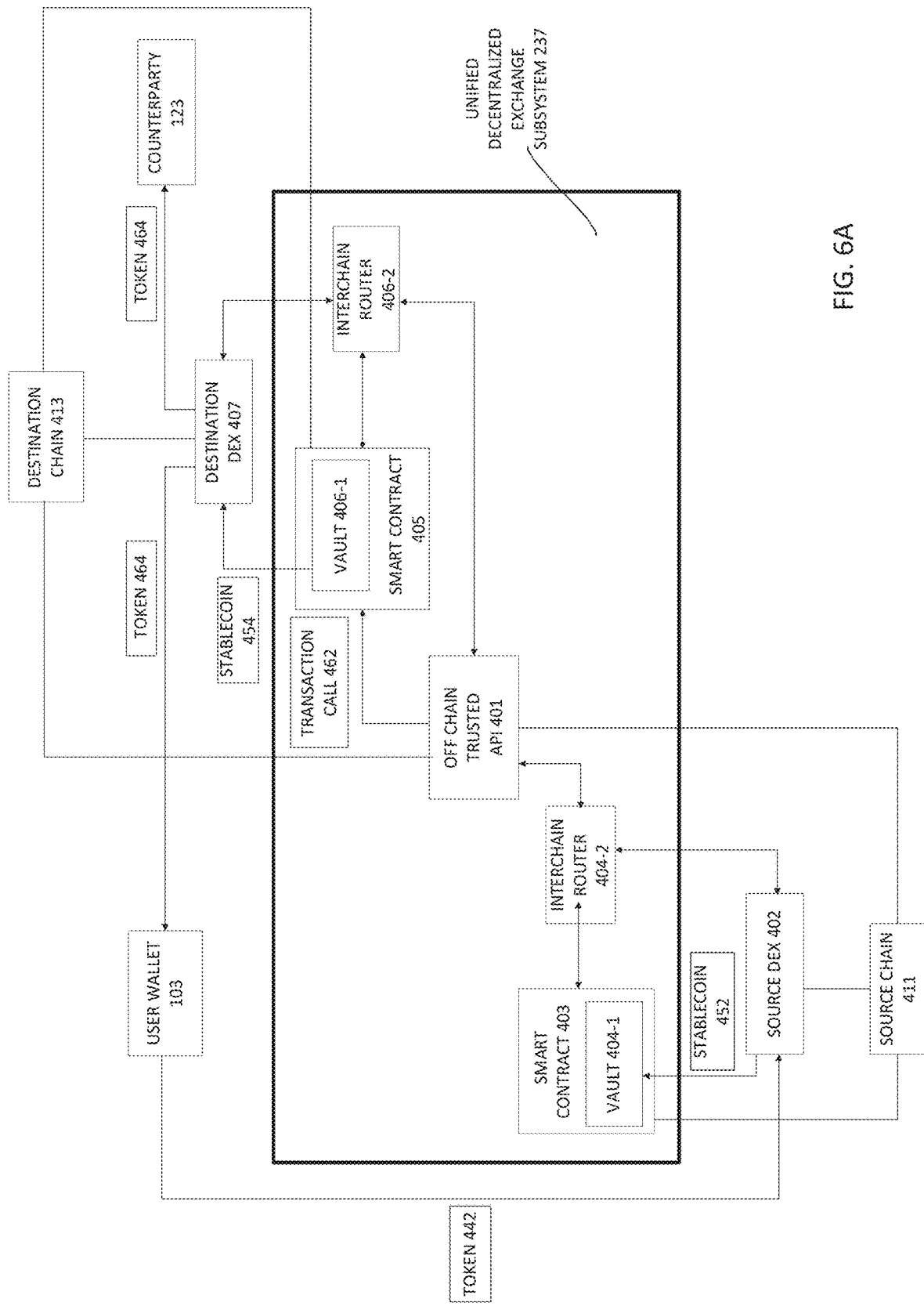
FIG. 6A is an illustrated example of an embodiment of a unified decentralized exchange subsystem or a unified trust-minimized exchange subsystem.

UDEXS 237 is shown in further detail in FIG. 6A. In FIG. 6A, UDEXS 237 comprises a plurality of smart contracts, for example smart contracts 403 and 405 deployed on source chain 411 and destination chain 413 respectively; and a off-chain trusted API, or alternatively an off-chain trusted API 401 which is communicatively coupled to source chain 411 and destination chain 413 using techniques known to those of skill in the art.

A smart contract implements a vault and functionalities to store liquidity in or retrieve liquidity from the vault. A vault is similar to a wallet in that it can hold multiple types of assets. In some embodiments, the vault is programmatically set to accept only one or more stablecoins. For example, since a variant of a stablecoin minted on a chain only has value on that chain, then once the smart contract 403 is deployed, the vault can only hold that variant of the stablecoin to operate on that chain. For example, smart contract 403 implements vault 404-1 and smart contract 405 implements vault 406-1. In some embodiments, the vault is a multiple signature vault.

Additionally, a plurality of interchain routers are used within UDEXS 237. An interchain router acts to:
facilitate swapping of tokens such as the source token from the user wallet into stablecoin destined for a vault, that is, a debit swap, and
facilitate swapping of stablecoin from a vault into tokens destined for a user wallet such as the destination token, that is, a credit swap.

Examples of interchain routers are interchain router 404-2 and interchain router 406-2.

Each interchain router is associated with a chain, and communicatively coupled to a DEX to enable the operations described above to be performed. For example, interchain router 404-2 is associated with source chain 411, since: interchain router 404-2 is associated with smart contract 403, which is in turn deployed on source chain 411. Similarly, interchain router 406-2 is associated with destination chain 413, since: interchain router 406-2 is associated with smart contract 405, which is in turn deployed on destination chain 413.

In some embodiments, the interchain router is implemented using an external provider such as 1 inch.

In some embodiments, one or more functionalities of the interchain router are implemented by the smart contract.

In some embodiments, the interchain router is entirely implemented by the smart contract.

The off-chain trusted API 401 is communicatively coupled to the various interchain routers and smart contracts on debit and credit swap legs using techniques known to those of skill in the art, so as to form an interconnected network. The operation of off-chain trusted API 401 in this interconnected network will be disclosed below.

In FIG. 6A, source DEX 402 is associated with source chain 411 and destination DEX 407 is associated with destination chain 413. As explained previously, prior art techniques do not facilitate interoperability between chains. The process outlined below facilitates interoperability between chains, by allowing for exchange of value between chains without requiring transfer of assets between chains. By obviating the need to transfer assets, this avoids the problems with asset transfer mechanisms outlined previously. Furthermore, the process outlined below is an interchain process, as it is indifferent to the specific blockchain networks which are the source and destination chains. This avoids the above-mentioned difficulties with the previously developed customized cross chain approaches.

In step 719, the UDEXS 237 receives transaction order 113.

In step 720, based on received transaction order 113, the off-chain trusted API 401 sends a command to the interchain router 404-2 to initiate a debit swap process through a source DEX 402.

The interchain router 404-2 configures the route for the calculated amount of source token to be directed from user wallet 103 to be converted into an amount of source stablecoin via the source DEX 402. This comprises the interchain router configuring all the settings and addresses needed for the calculated amount of source token to be routed from user wallet 103 to be converted into an amount of source stablecoin via the source DEX 402.

In step 722, off-chain trusted API 401 which is part of UDEXS 237 watches or monitors the on-chain process of the source DEX 402 on source chain 411, to determine a validation status of the debit swap, that is, whether the debit swap is being validated. In some of these embodiments, the determination is based on whether at least one block is written on the source chain 411, as the writing of the at least one block indicates that the gas fee is sufficient for the directing and conversion to be recorded on the source chain 411.

The off-chain trusted API 401 receives the following information related to the transaction order 113.

the value of the amount of source stablecoin which is to be deposited: In some embodiments, the value is received by the off-chain trusted API as part of one or more of steps 720 or 721. In some embodiments, the value is received when the debit swap is initiated or the route is selected;

the type of tokens referred to in the transaction; and the source and destination chains.

When, in step 722, it is determined that the debit swap is being validated, the off-chain trusted API 401 confirms the received information related to the transaction order 113. Following this, process 723 comprising steps 723-1 and 723-2; and process 724 comprising steps 724-1 to 724-6 take place in parallel.

In step 723-1, the calculated amount of the source token is then directed to interchain router 404-2. The interchain router 404-2 then directs the token to a source DEX 402 from user wallet 103, where it is converted into the native coin of the source chain 411 that the token resides on, and then into an amount of source stablecoin such as USDC. The directing is performed using the route selected in step 721. As shown in FIG. 6A, calculated amount of the source token 442 is routed to source DEX 402 and converted into stablecoin 452.

In step 723-2, the smart contract then facilitates the storage, depositing or debiting of the amount of source stablecoin in the vault 404-1. The use of stablecoin ensures that the value remains consistent and minimizes the impact of market fluctuations during the swap process. As shown in FIG. 6A, stablecoin 452 is stored in vault 404-1.

Figure 7C:
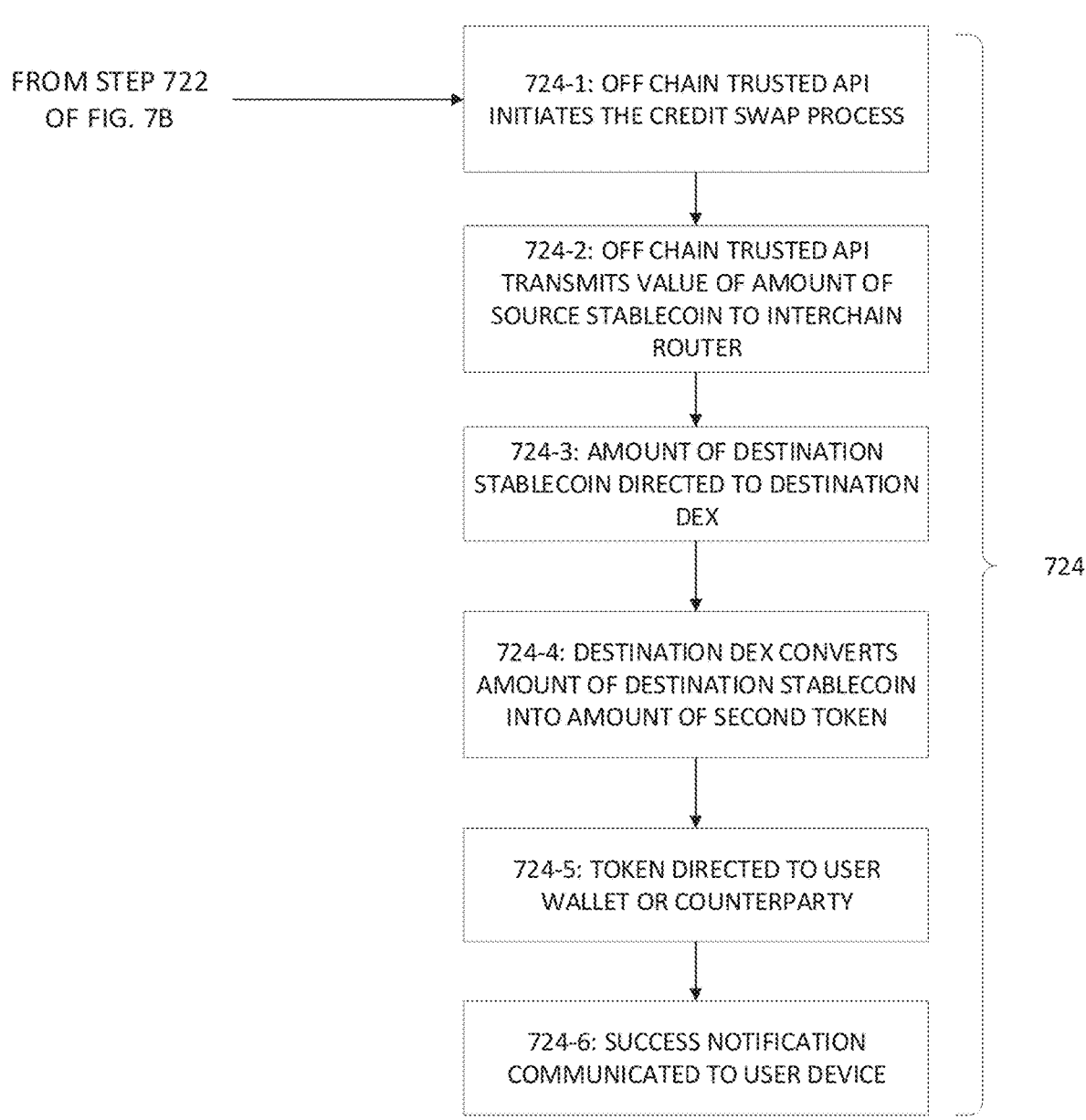
FIG. 7C is an illustrated example of an embodiment of credit swap operation.

Process 724 as shown in FIG. 7C comprises the credit swap process. In this process, the UDEXS 237 performs a credit swap through a destination DEX 407 using interchain router 406-2.

In step 724-1, based on the confirmed received information related to the transaction order 113, the off-chain trusted API 401 initiates the credit swap process. The step of initiating the credit swap process comprises performing a transaction call 462 on the smart contract 405 on destination chain 413 using a private key and through a JavaScript Object Notation (JSON) Remote Procedure Call (RPC) request. Performing the call 462 comprises the off-chain trusted API 401 transmitting the value of the amount of source stablecoin to be deposited in vault 404-1 to the smart contract 405 related to the destination chain 413.

In the embodiments where the vault is a multiple signature vault, the step of initiating the credit swap process further comprises the smart contract 405 requesting a plurality of signatures. In some embodiments, the plurality of signatures come from a plurality of different signatories.

In some of the embodiments where the plurality of signatures come from a plurality of different signatories, each of the signatories sign to authorize different parts of the transaction. For example:

Signatory 1 writes the transaction values and provides a signature;

Signatory 2 writes the transaction values, pays the gas fee, provides a signature as well, and executes the transaction.

In other embodiments, the step of initiating the credit swap process comprises off-chain trusted API 401 approving the transaction. After the off-chain trusted API 401 approves the transaction, the off-chain trusted API 401 initiates a call to the smart contract 405 to authorize the sending of the correct amount of stablecoin from the vault 406-1.

The remaining steps of the credit swap process 724-2 to 724-6 comprise the interchain router 406-2 facilitating the conversion of destination stablecoin into an amount of destination token, and the directing of the amount of destination token to user wallet 103 or counterparty 123.

In step 724-2, after either the plurality of signatures is received, or approval is received from the off-chain trusted API 401 by smart contract 405 and the authorization is complete, the off-chain trusted API 401 transmits the value of the amount of source stablecoin to be deposited in vault 404-1 to the interchain router 406-2.

In step 724-3, the interchain router 406-2 then directs the required amount of destination stablecoin from vault 406-1 to destination DEX 407 on the destination chain 413. The value of the amount of destination stablecoin directed is equal to the value of the amount of source stablecoin deposited in vault 404-1. As shown in FIG. 6A, stablecoin 454 is directed from vault 406-1 to destination DEX 407.

In step 724-4, destination DEX 407 converts the amount of destination stablecoin into an amount of destination token for direction to either user wallet 103 or a counterparty 123. In some embodiments, the destination stablecoin is first converted into the native coin of the destination chain, and finally into an amount of destination token before direction to either user wallet 103 or a counterparty 123. In other embodiments, the destination stablecoin is converted directly into an amount of destination token before direction to either user wallet 103 or a counterparty 123. As shown in FIG. 6A, an amount of stablecoin 454 is routed to destination DEX 407, where it is converted to an amount of token 464.

In step 724-5, the amount of the destination token is directed to user wallet 103 or counterparty 123. As shown in FIG. 6A, the amount of the destination token 464 is directed to either user wallet 103 or counterparty 123.

In step 724-6, once the directing of the amount of the destination token is complete, an event based webhook corresponding to a success is transmitted from UDEXS 237 to the PSP 108 via, for example, communications subsystem 238 and outgoing signals 260. PSP 108 then communicates a success notification to the third-party application host 112, which then communicates this to the user device 110.

The process described above in steps 724-2 to 724-6 enables the value corresponding to the amount of source stablecoin to be transferred across chains in a parallelized manner rather than in a serial manner. Operating in a serial manner entails:
 waiting for full confirmation of the completion of the debit swap on the source chain 411,
 exchanging assets between the source and destination chain 413, and then
 completing the credit swap on the destination chain 413.

This process is slow, and may lead to security issues, as different chains need to communicate with each other.

In the process described above, once an indication is received that the debit swap is validated, the credit swap is commenced. In this way, the debit swap and credit swap processes occur in parallel. The off-chain trusted API 401 enables this parallelization to take place. This parallelization allows for real-time value exchange between the source and destination chains by removing the need to exchange assets between these chains, thereby improving interoperability and consequently seamlessness, efficiency and scalability.

Furthermore, while the above is described for a pair of interchain routers, each associated with a pair of smart contracts, one of skill in the art would realize that the above can be generalized to a plurality of interchain routers, where each of the interchain routers is associated with one of a plurality of smart contracts.

The above-described process is an interchain process, as it is indifferent to the specific blockchain networks. Once smart contracts and interchain routers are installed and configured to operate on both the source and destination chain, and the off-chain trusted API is communicatively coupled to the smart contracts and interchain routers on both the source and destination chain, the process described above can be performed for each transaction without needing to customize the process to the specific blockchain networks. Users do not encounter the above-mentioned difficulties and complexities associated with the previously developed customized cross-chain approaches.

Figure 6B:
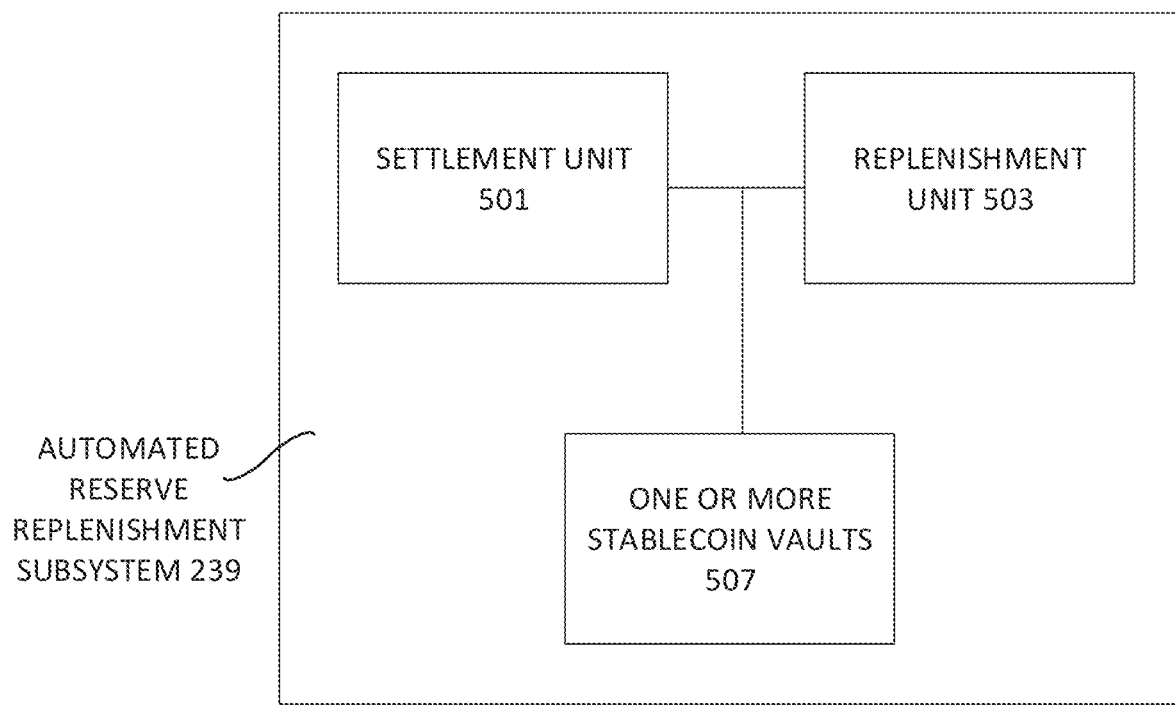
FIG. 6B is an illustrated example of an embodiment of an automated reserve replenishment subsystem.

ARRS 239 is shown in detail in FIG. 6B. ARRS 239 comprises settlement unit 501, replenishment unit 503 and one or more stablecoin vaults 507. ARRS 239 is the component of real-time trust-minimized value exchange rail 107 which implements automated liquidity management. As explained above, automated liquidity management is necessary to ensure continued seamless operation of DeFi systems.

The one or more stablecoin vaults 507 comprise, for example, vault 404-1 and vault 406-1.

Replenishment unit 503 records the various debits and credits to the one or more stablecoin vaults 507, and operates on the one or more stablecoin vaults 507 to manage the amounts held in the vaults. As described above, debits increase an amount held within a vault, while credits decrease an amount held within the vault. Then, as debits and credits occur, the amount held fluctuates. When the amount held is above a target, a bulk asset transfer to a reserve hub or centralized exchange (CEX) is scheduled and performed using one or more APIs and processes requiring multiple signatures. When an amount held is below a target, a replenishment from a reserve hub or CEX is performed. While a reserve hub has been disclosed above, one of skill in the art would know that there are other possible arrangements which could serve the purpose of holding stablecoin for replenishment. In some embodiments, these arrangements are provided by third party providers, such as a third-party custodial enterprise-grade solution. An example is the CIRCLE MINT product.

In some embodiments, the one or more targets are set using AI and ML-based techniques. Similar to as explained above, in some of the embodiments where AI and ML-based techniques are used, the replenishment unit 503 performs one or more of the operations related to these AI and ML-based techniques, as listed previously. In some embodiments, these activities are performed using, for example, an AI or ML target engine within replenishment unit 503. In some embodiments, the AI and ML-based techniques are implemented by an outside provider.

Figure 8:
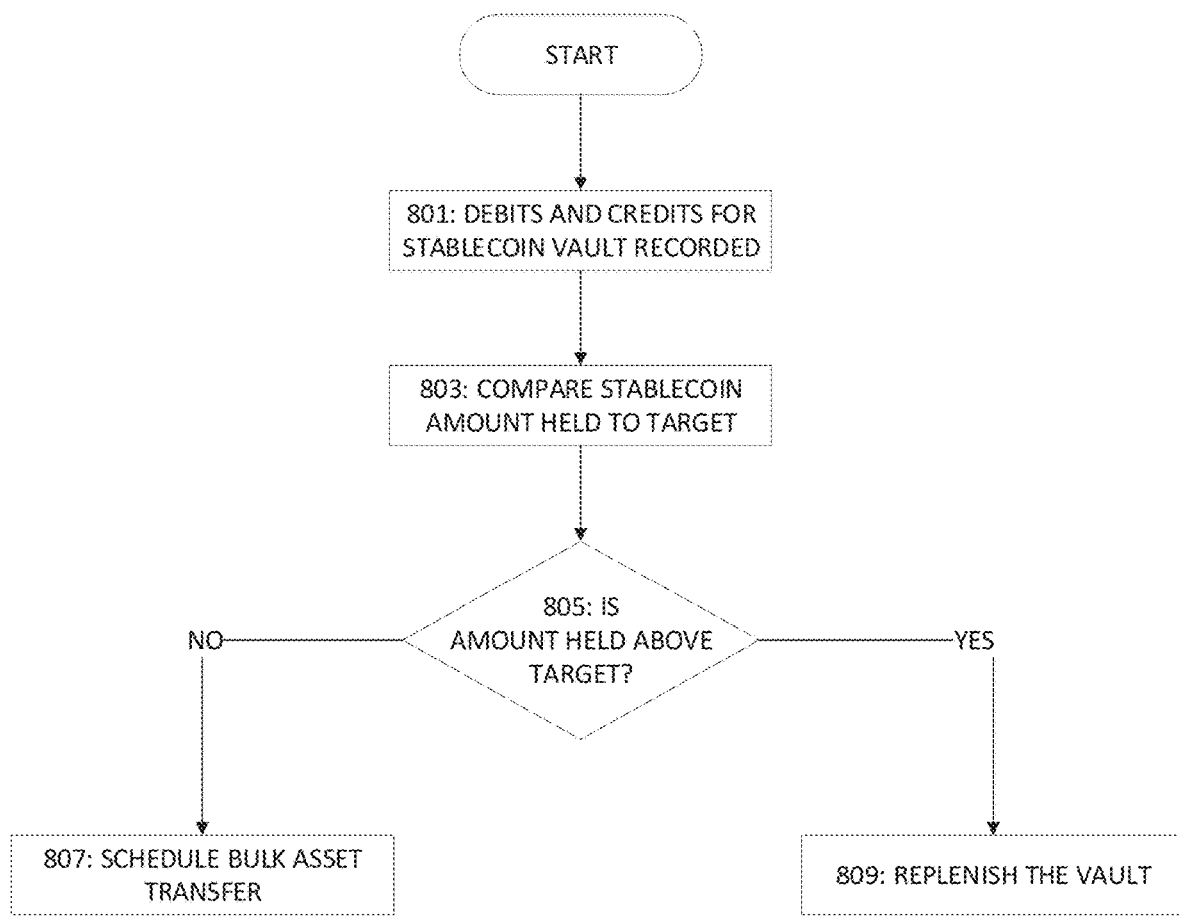
FIG. 8 is an illustrated example of an embodiment of a process to manage a balance in the vault.

An example embodiment of this balance management process for a first of the one or more stablecoin vaults 507 is shown in FIG. 8. In step 801 of FIG. 8, the various debits and credits for a stablecoin vault are recorded. In steps 803 and 805 of FIG. 8, the amount of the first stablecoin amount held is compared to a target. When the amount held is above the target, then a bulk asset transfer from a reserve hub is scheduled in step 807. When the amount held is below the target, then a replenishment from the reserve hub is performed in step 809. These processes would run separately and then instruct the API based on the forecasts.

In addition to being decentralized, the method and system described above is trust-minimized because it reduces the reliance on a single central authority or trusted custodian for inter-chain transactions. The system and method described above operates in a decentralized and parallelized/pipelined manner through:
 the risk assessment performed by the OCCP,
 the deployment of smart contracts on multiple chains, the coordination of the smart contracts on the source and destination chains via the off-chain trusted API, and the use of decentralized exchanges (DEXs).

These components work together to minimize trust requirements and enhance the security and decentralization of the protocol.

A formula which represents the system and method above is shown below:

$$M_1 = m(s(T_1A, T_1B) \| s(T_2A, T_2B, v(T_1A, T_1B)) \|)$$

In this formula:

$M_1$ represents the parallel inter-chain value exchange process.

m( ): The main function representing the entire process, which encompasses both on-chain and off-chain components. It coordinates the communication between the source and destination blockchains, synchronizing the transaction values and asset swaps.

s( ): The swap function, responsible for executing the asset swaps on each respective blockchain. In the formula, there are two instances of the s( ) function: s($T_1A$, $T_1B$) for the source chain and s($T_2A$, $T_2B$) for the destination chain.

‖: The parallel execution symbol, indicating that the swaps on the source and destination chains are executed simultaneously. Parallel execution is used to reduce transaction times and improve efficiency.

v( ): The value function, which represents the value of the asset being swapped on the source chain, denoted by v($T_1A$, $T_1B$). This value is used in the destination chain swap (s ($T_2A$, $T_2B$)) to determine the corresponding value of the asset being swapped on the destination chain.

In some embodiments, a user wants to purchase a digital asset with fiat currency. In these embodiments, third party application host 112 comprises an on-ramp which converts fiat currency to stablecoin. Once the fiat to stablecoin conversion has been approved, the PSP 108 authorizes the order and sends it to the off-chain trusted API to perform the inter-chain swap. Then, the source chain or debit swap process comprises routing the stablecoin from the on-ramp to the source chain vault. The destination chain or credit swap process takes place in parallel as described above in steps 721, 725 and 727. This enables a wider range of fiat currency to be used to purchase a token of choice for a user. A formula to represent this is given below:

$$M_{1,\text{onramp}} = m(s(T_1A, T_1B) \| s(T_2A, T_2B, v(\text{Fiat,Stablecoin})) \|)$$

where m( ), s( ), ‖ and v( ) are as described above.

In other embodiments, a user wants to convert a digital asset into fiat currency. In these embodiments, third party application host 112 comprises an off-ramp. The source chain or debit swap process comprises converting the digital asset to stablecoin which is then deposited into the source chain vault. The destination chain or credit swap process which takes place in parallel comprises routing the stablecoin from the destination chain vault to the off-ramp, where it is converted into fiat currency. This enables the user to receive a wider range of fiat currency in exchange for a token. A formula to represent this is given below:

$$M_{1,\text{offramp}} = m(s(T_1A, T_1B) \| s(T_2A, T_2B, v(\text{Stablecoin, Fiat})) \|)$$

where m( ), s( ), ‖ and v( ) are as described above.

While the above-described systems and methods have been described with respect to stablecoin, one of skill in the art would know that this is one possible embodiment. One of skill in the art would know that: Any stable or near-stable fungible token which preserves value and therefore imposes no risk is suitable to play the same roles that stablecoin plays in the above-described systems and methods.

In one example embodiment, a system for trust-minimized real-time inter-chain value-exchange between a source token and a destination token. The system comprises: a real-time trust-minimized value exchange rail communicatively coupled to a payment services provider via a network. The real-time trust-minimized value exchange rail comprises a unified trust-minimized exchange subsystem further comprising: an off-chain trusted API communicatively coupled to: a first interchain router and a second interchain router, and a first smart contract and a second smart contract. The first smart contract is associated with a source chain and comprises a first vault. The second smart contract is associated with a destination chain and comprises a second vault. The first interchain router is associated with the first smart contract and communicatively coupled to a source DEX associated with the source chain. The second interchain router is associated with the second smart contract and communicatively coupled to a destination DEX associated with the destination chain. The real-time trust-minimized value exchange rail receives a transaction order from the payment services provider. Based on the received transaction order, the off-chain trusted API initiates a debit swap of an amount of the source token to an amount of source stablecoin using the first interchain router and the source DEX. The debit swap further comprises the amount of the source token being directed to the source DEX from a source cryptocurrency address, the amount of the source token being converted into the amount of the source stablecoin via the source DEX, and the first smart contract facilitating the storage of the amount of source stablecoin in the first vault. The off-chain trusted API monitors an on-chain process associated with the source DEX to determine a validation status of the debit swap. The off-chain trusted API receives information related to the transaction order comprising a value corresponding to the amount of source stablecoin. When the off-chain trusted API determines the debit swap is being validated, the off-chain trusted API initiates a credit swap. The initiating comprises performing a transaction call on the second smart contract, which comprises: the off-chain trusted API transmitting the value to the second smart contract. The credit swap further comprises: the second interchain router directing an amount of destination stablecoin corresponding to the value from the second vault to the destination DEX for conversion into an amount of the destination token, the second interchain router directing the amount of the destination token to a destination cryptocurrency address communicatively coupled to the real-time trust-minimized value exchange rail, and further wherein at least some part of the debit swap and credit swap occur in parallel.

In one or more of the above examples, the first interchain router is implemented within the first smart contract.

In one or more of the above examples, some functionalities of the first interchain router are implemented within the first smart contract.

In one or more of the above examples, the first interchain router is implemented by an external provider.

In one or more of the above examples, the system further comprises an ARRS. The ARRS comprises a replenishment unit coupled to the first vault. The replenishment unit replenishes the first vault when an amount held within the first vault is below a target, and the replenishment unit performs a bulk transfer when the amount held within the first vault is above a target.

In one or more of the above examples, the replenishment unit performs the bulk transfer or replenishing using one of a reserve hub, and a centralized exchange.

In one or more of the above examples, the replenishment unit performs the bulk transfer or replenishing using a third-party custodial enterprise-grade solution.

In one or more of the above examples, the payment services provider determines the source token and the destination token as being in accordance with an OCCP.

In one or more of the above examples, based on the initiating of the debit swap, the first swap router selects a first route for converting an amount of the first token into an amount of a source stablecoin via the source DEX, and the first swap router configures the first route.

In one or more of the above examples, the initiating of the credit swap comprises either the second smart contract requesting a plurality of signatures, or the off-chain trusted API approving the transaction.

In one example embodiment, a method for trust-minimized real-time inter-chain value-exchange between a source token and a destination token. A real-time trust-minimized value exchange rail is communicatively coupled to a payment services provider via a network. The real-time trust-minimized value exchange rail comprises a unified trust-minimized exchange subsystem further comprising: an off-chain trusted API communicatively coupled to: a first interchain router and a second interchain router, and a first smart contract and a second smart contract. The first smart contract is associated with a source chain and comprises a first vault. The second smart contract is associated with a destination chain and comprises a second vault. The first interchain router is associated with the first smart contract and communicatively coupled to a source DEX associated with the source chain. The second interchain router is associated with the second smart contract and communicatively coupled to a destination DEX associated with the destination chain. The method further comprises: receiving, by the real-time trust-minimized value exchange rail, a transaction order from the payment services provider. Based on the receiving, the method comprises initiating, by the off-chain trusted API, a debit swap of an amount of the source token to an amount of source stablecoin using the first interchain router and the source DEX. The debit swap further comprises directing the amount of the source token to the source DEX from a source cryptocurrency address, converting the amount of the source token into the amount of the source stablecoin via the source DEX, and facilitating, by the first smart contract, the storage of the amount of source stablecoin in the first vault. The method comprises monitoring, by the off-chain trusted API, an on-chain process associated with the source DEX to determine a validation status of the debit swap. The method comprises receiving, by the off-chain trusted API, information related to the transaction order comprising a first value corresponding to the amount of source stablecoin. When the off-chain trusted API determines the debit swap is being validated, the method comprises initiating, by the off-chain trusted API, a credit swap, wherein the initiating comprises performing a transaction call on the second smart contract, which further comprises: the off-chain trusted API transmitting the first value to the second smart contract. The credit swap further comprises: directing, by the second interchain router, an amount of destination stablecoin corresponding to the first value from the second vault to the destination DEX for conversion into an amount of the destination token, and directing, by the second interchain router, the amount of the destination token to a destination cryptocurrency address communicatively coupled to the real-time trust-minimized value exchange rail, and further wherein at least some part of the debit swap and credit swap occur in parallel.

In one or more of the above examples, the first interchain router is implemented within the first smart contract.

In one or more of the above examples, some functionalities of the first interchain router are implemented within the first smart contract.

In one or more of the above examples, the first interchain router is implemented by an external provider.

In one or more of the above examples, the method comprises replenishing, by a replenishment unit, the first vault when an amount held within the first vault is below a target, and performing, by the replenishment unit, a bulk transfer when the amount held within the first vault is above a target.

In one or more of the above examples, the replenishment unit performs the bulk transfer or replenishing using a third-party custodial enterprise-grade solution.

In one or more of the above examples, the method comprises determining, by the payment services provider, the source token and the destination token as being in accordance with an OCCP.

In one or more of the above examples, the method comprises selecting, by the first swap router and based on the initiating of the debit swap, a first route for converting an amount of the first token into an amount of a source stablecoin via the source DEX, and configuring, by the first swap router, the first route.

In one or more of the above examples, the initiating of the credit swap comprises: either the second smart contract requesting a plurality of signatures; or the off-chain trusted API approving the transaction.

In one example embodiment, a system to determine accordance of a token with an OCCP. The system comprises an interchain payments API, which in turn comprises a clearing unit and a protocol database storing one or more criteria related to the OCCP. The clearing unit and the protocol database are communicatively coupled with each other. The clearing unit communicates with the protocol database to retrieve the one or more criteria. The clearing unit uses the one or more retrieved criteria to perform one or more assessment operations for the token. Based on the performing of the one or more assessment operations, the clearing unit determines whether the token is in accordance with the OCCP.

In one or more of the above examples, the one or more assessment operations comprise an anti-money laundering (AML) check, a fraud check, a code flaw identification and check, a liquidity pool status check, and a liquidity pool amount check.

In one or more of the above examples, the one or more assessment operations comprise performing one or more behaviour prediction or forecasting operations.

In one or more of the above examples, the one or more assessment operations are performed using algorithms based on artificial intelligence or machine learning.

In one or more of the above examples, the one or more assessment operations comprise one or more review operations.

In one or more of the above examples, when the clearing unit determines that the token is in accordance with the OCCP, the clearing unit stores data and information to facilitate transactions around the token.

In one or more of the above examples, the interchain payments API is located within a payment services provider. The payment services provider further comprises a token API. The payment services provider is communicatively coupled to a third-party application host via a network. The token API sends a list of tokens determined to be in accordance with the OCCP to the third-party application host for presentation on a display of a user device communicatively coupled to the third party application host via the network.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A system for trust-minimized real-time inter-chain value-exchange between a source token and a destination token comprising:

a real-time trust-minimized value exchange rail communicatively coupled to a payment services provider via a network, wherein:

the real-time trust-minimized value exchange rail comprises:
- a unified trust-minimized exchange subsystem further comprising:
  - a processor;
  - a memory storing instructions that when executed cause the processor to perform operations comprising:
    - an off-chain trusted API communicatively coupled to:
      - a first interchain router and a second interchain router, and
      - a first smart contract and a second smart contract, wherein:
        - the first smart contract is associated with a source chain and comprises a first vault,
        - the second smart contract is associated with a destination chain and comprises a second vault,
        - the first interchain router is associated with the first smart contract and communicatively coupled to a source decentralized exchange (DEX) associated with the source chain, and
        - the second interchain router is associated with the second smart contract and communicatively coupled to a destination DEX associated with the destination chain;

wherein:
- the real-time trust-minimized value exchange rail receives a transaction order from the payment services provider,
- based on the received transaction order, the off-chain trusted API initiates a debit swap of an amount of the source token to an amount of source stablecoin using the first interchain router and the source DEX,
- the debit swap further comprising
  - the amount of the source token being directed to the source DEX from a source cryptocurrency address,
  - the amount of the source token being converted into the amount of the source stablecoin via the source DEX, and
  - the first smart contract facilitating the storage of the amount of source stablecoin in the first vault,
- the off-chain trusted API monitors an on-chain process associated with the source DEX to determine a validation status of the debit swap,
- the off-chain trusted API receives information related to the transaction order comprising a value corresponding to the amount of source stablecoin,
- when the off-chain trusted API determines the debit swap is being validated, the off-chain trusted API initiates a credit swap, wherein the initiating comprises
  - performing a transaction call on the second smart contract, comprising:
    - the off-chain trusted API transmitting the value to the second smart contract, the credit swap further comprising:
      - the second interchain router directing an amount of destination stablecoin corresponding to the value transmitted to the second smart contract to the destination DEX for conversion into an amount of the destination token, the second interchain router directing the amount of the destination token to a destination cryptocurrency address communicatively coupled to the real-time trust-minimized value exchange rail, and further wherein at least some part of the debit swap and credit swap occur in parallel.

2. The system of claim 1, wherein the first interchain router is implemented within the first smart contract.

3. The system of claim 1, wherein some functionalities of the first interchain router are implemented within the first smart contract.

4. The system of claim 1, wherein the first interchain router is implemented by an external provider.

5. The system of claim 1, further comprising an automated reserve replenishment subsystem (ARRS), wherein:
the ARRS comprises a replenishment unit coupled to the first vault, further wherein:
the replenishment unit replenishes the first vault when an amount held within the first vault is below a target, and
the replenishment unit performs a bulk transfer when the amount held within the first vault is above a target.

6. The system of claim 5, wherein the replenishment unit performs the bulk transfer or replenishing using one of:
a reserve hub, and
a centralized exchange.

7. The system of claim 5, wherein the replenishment unit performs the bulk transfer or replenishing using a third-party custodial enterprise-grade solution.

8. The system of claim 1, wherein the payment services provider determines the source token and the destination token as being in accordance with an on-chain clearing protocol (OCCP).

9. The system of claim 1, wherein:
based on the initiating of the debit swap, the first interchain router selects a first route for converting an amount of the first token into an amount of a source stablecoin via the source DEX, and
the first interchain router configures the first route.

10. The system of claim 1, wherein the initiating of the credit swap comprises:
either the second smart contract requesting a plurality of signatures;
or the off-chain trusted API approving the transaction.

11. A method for trust-minimized real-time inter-chain value-exchange between a source token and a destination token comprising:
providing a real-time trust-minimized value exchange rail communicatively coupled to a payment services provider via a network, wherein:
the real-time trust-minimized value exchange rail comprises:
a unified trust-minimized exchange subsystem further comprising:
an off-chain trusted API communicatively coupled to:
a first interchain router and a second interchain router, and
a first smart contract and a second smart contract, wherein:
the first smart contract is associated with a source chain and comprises a first vault,
the second smart contract is associated with a destination chain and comprises a second vault,
the first interchain router is associated with the first smart contract and communicatively coupled to a source decentralized exchange (DEX) associated with the source chain, and
the second interchain router is associated with the second smart contract and communicatively coupled to a destination DEX associated with the destination chain;
receiving, by the real-time trust-minimized value exchange rail, a transaction order from the payment services provider;
based on the receiving, initiating, by the off-chain trusted API, a debit swap of an amount of the source token to an amount of source stablecoin using the first interchain router and the source DEX,
the debit swap further comprising
directing the amount of the source token to the source DEX from a source cryptocurrency address,
converting the amount of the source token into the amount of the source stablecoin via the source DEX, and
facilitating, by the first smart contract, the storage of the amount of source stablecoin in the first vault;
monitoring, by the off-chain trusted API, an on-chain process associated with the source DEX to determine a validation status of the debit swap;
receiving, by the off-chain trusted API, information related to the transaction order comprising a first value corresponding to the amount of source stablecoin; and
determining, by the off-chain trusted API, the debit swap is being validated; and
when the off-chain trusted API determines the debit swap is being validated, initiating, by the off-chain trusted API, a credit swap, wherein the initiating comprises:
performing a transaction call on the second smart contract, comprising:
the off-chain trusted API transmitting the first value to the second smart contract,
the credit swap further comprising:
directing, by the second interchain router, an amount of destination stablecoin corresponding to the first value transmitted to the second smart contract to the destination DEX for conversion into an amount of the destination token, and
directing, by the second interchain router, the amount of the destination token to a destination cryptocurrency address communicatively coupled to the real-time trust-minimized value exchange rail, and
further wherein at least some part of the debit swap and credit swap occur in parallel.

12. The method of claim 11, wherein the first interchain router is implemented within the first smart contract.

13. The method of claim 11, wherein some functionalities of the first interchain router are implemented within the first smart contract.

14. The method of claim 11, wherein the first interchain router is implemented by an external provider.

15. The method of claim 11, further comprising
replenishing, by a replenishment unit, the first vault when an amount held within the first vault is below a target, and
performing, by the replenishment unit, a bulk transfer when the amount held within the first vault is above a target.

16. The method of claim 15, wherein the replenishment unit performs the bulk transfer or replenishing using one of:
   a reserve hub, and
   a centralized exchange.

17. The method of claim 15, wherein the replenishment unit performs the bulk transfer or replenishing using a third-party custodial enterprise-grade solution.

18. The method of claim 11, further comprising:
   determining, by the payment services provider, the source token and the destination token as being in accordance with an on-chain clearing protocol (OCCP).

19. The method of claim 11, further comprising:
   based on the initiating of the debit swap, selecting, by the first interchain router, a first route for converting an amount of the first token into an amount of a source stablecoin via the source DEX, and
   configuring, by the first interchain router, the first route.

20. The method of claim 11, wherein the initiating of the credit swap comprises:
   either the second smart contract requesting a plurality of signatures;
   or the off-chain trusted API approving the transaction.

* * * * *